United States Patent
Kobata et al.

(10) Patent No.: US 7,999,015 B2
(45) Date of Patent: Aug. 16, 2011

(54) CURABLE AQUEOUS COMPOSITION

(75) Inventors: Masami Kobata, Hiratsuka (JP); Shinji Tsushima, Hiratsuka (JP)

(73) Assignee: Kansai Paint Co., Ltd., Amágasaki-shi (JP)

( * ) Notice: Subject to any disclaimer, the term of this patent is extended or adjusted under 35 U.S.C. 154(b) by 541 days.

(21) Appl. No.: 12/280,091

(22) PCT Filed: Feb. 23, 2007

(86) PCT No.: PCT/JP2007/053420
§ 371 (c)(1),
(2), (4) Date: Aug. 20, 2008

(87) PCT Pub. No.: WO2007/097430
PCT Pub. Date: Aug. 30, 2007

(65) Prior Publication Data
US 2010/0230291 A1    Sep. 16, 2010

(30) Foreign Application Priority Data

Feb. 24, 2006 (JP) .................................. 2006-048246
Aug. 10, 2006 (JP) .................................. 2006-218748

(51) Int. Cl.
  C08K 3/20    (2006.01)
  C08G 59/50    (2006.01)
  C08L 63/02    (2006.01)
(52) U.S. Cl. ...................................... 523/415; 524/591
(58) Field of Classification Search .................. None
  See application file for complete search history.

(56) References Cited

FOREIGN PATENT DOCUMENTS

| WO | WO 93/16133 A2 | 8/1993 |
| WO | WO 94/21738 A1 | 9/1994 |
| WO | WO 01/77202 A1 | 10/2001 |
| WO | WO 2006/106942 A1 | 10/2006 |

OTHER PUBLICATIONS

CAS registry No. 24309-97-5 for N-(2-hydroxyethyl)acetoacetamide, 2011, one page.*
Jianrong Feng et al.: Formation and Crosslinking of Latex Films through the Reaction of Acetoacetoxy Groups with Diamines under Ambient Conditions, J. Coat. Technol., 70 (881), 1998, 57-68.
J.E. Blasko et al.: Waterborne Polymers for Use in Thermoset Coatings: A New Hydrolysis Resistant Monomer as a Replacement for Acetoacetoxyethyl Methacrylate, J. Coat. Technol., 74 (925), 2002, 83-87.

* cited by examiner

*Primary Examiner* — Robert Sellers
(74) *Attorney, Agent, or Firm* — Kratz, Quintos & Hanson, LLP

(57) ABSTRACT

The present invention provides an aqueous curable composition comprising (A) a compound comprising all or some primary amino groups and/or secondary amino groups optionally neutralized with a Brønsted acid, and (B) a crosslinking agent, the crosslinking agent being a compound having an (N-alkyl-N-(2-acylacyl)amino)alkyloxycarbonylamino group represented by General Formula (I)

$$\begin{array}{c} R^1 \quad R^2 \\ \diagdown \diagup \\ C \\ \diagup \quad \diagdown \\ R^3 \quad N-Y-O-\overset{O}{\underset{\|}{C}}-\overset{H}{\underset{}{N}}- \\ \quad | \\ R^4-CH \\ \quad \diagdown C=O \\ \quad | \\ H_2C \\ \quad | \\ R^5 \end{array} \tag{I}$$

wherein $R^1$, $R^2$ and $R^3$ are each independently a hydrogen atom or $C_{1-7}$ alkyl group, $R^4$ and $R^5$ are each independently a hydrogen atom or $C_{1-16}$ organic group, and Y is a straight $C_{1-6}$ alkylene group optionally substituted with a $C_{1-6}$ organic group as a substituent.

17 Claims, No Drawings

CURABLE AQUEOUS COMPOSITION

TECHNICAL FIELD

The present invention relates to an aqueous curable composition.

BACKGROUND ART

A composition comprising a carbonyl group-containing compound and an amino group-containing compound is cured by baking or drying at room temperature, and thus is useful for coating compositions, adhesives, etc.

J. Coat. Technol., 70 (881), 57-68 (1998), for example, discloses that a composition comprising an acetoacetoxy group-containing polymer and a diamine compound forms a crosslinking coating film at room temperature. The acetoacetoxy group-containing polymer, however, has problematic storage stability, since it dissolves in water with time due to the reverse Claisen condensation reaction of the acetoacetoxy group, or another reaction.

J. Coat. Technol., 74 (925), 83-87 (2002) reported a copolymer comprising 3-isopropenyl-α,α'-dimethylbenzyl acetoacetamido and other vinyl-based monomers as a resin comprising an acetoacetamido group reacted with an amino group, which is not easily dissolved in water relative to a resin having an acetoacetoxy group. However, one drawback of 3-isopropenyl-α,α'-dimethylbenzyl acetoacetamido is that the production process is complicated. Specifically, the 3-isopropenyl-α,α'-dimethylbenzyl acetoacetamido requires multistage reactions when produced from commercially available material, and further requires extractive and distillation purification in the course of production.

WO01/077202 discloses an acetoacetamido group-containing compound obtained by reacting N-(2-hydroxyethyl)acetoacetamido and a polyisocyanate, and an aqueous two-component-version crosslinkable composition comprising the acetoacetamido group-containing compound and an amino-functional epoxy-derived polymer. However, even when diluted with an organic solvent, etc., the acetoacetamido group-containing compound likely becomes solid or semi-solid, exhibiting low fluidity, and thus needs to be pulverized or pressed into pellets to produce the composition. The compound has other drawbacks such as poor compatibility with amino group-containing compounds, and the like.

DISCLOSURE OF THE INVENTION

Problem to be Solved by the Invention

The object of the present invention is to provide an aqueous curable composition having excellent storage stability and room-temperature curability.

The present inventors carried out extensive research to solve the above object. As a result, they found that a compound having the specific structure of (N-alkyl-N-(2-acylacyl)amino)alkyloxycarbonylamino group, or a dilution thereof, has excellent fluidity, and therefore the following advantages can be obtained: the steps of pulverization and pelletization are unnecessary; the compound has excellent compatibility with an amino group-containing compound; and a composition including the above-described compound as a crosslinking agent of the specific amino group-containing compound exhibits excellent storage stability and room-temperature curability, etc. The present invention was accomplished as a result of further research based on these findings.

The present invention provides the following aqueous curable resin composition.

1. An aqueous curable composition comprising:
(A) a compound having all or some primary amino groups and/or secondary amino groups optionally neutralized with a Brønsted acid; and
(B) a crosslinking agent, the crosslinking agent being a compound having an (N-alkyl-N-(2-acylacyl)amino)alkyloxycarbonylamino group represented by General Formula (I)

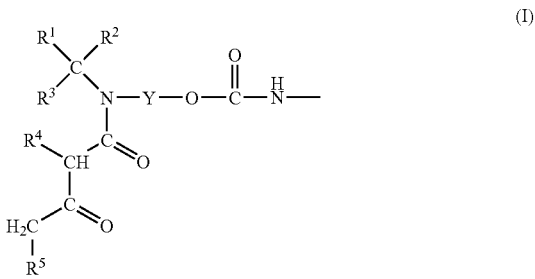

wherein $R^1$, $R^2$ and $R^3$ are each independently a hydrogen atom or $C_{1-7}$ alkyl group, $R^4$ and $R^5$ are each independently a hydrogen atom or $C_{1-16}$ organic group, and Y is a straight $C_{1-6}$ alkylene group optionally substituted with a $C_{1-6}$ organic group as a substituent.

2. An aqueous curable composition according to Item 1, wherein the compound (A) is at least one member selected from the group consisting of (polyamino)alkanes, (polyamino)polyether compounds, poly(ethyleneimine) compounds, and poly(aminoalkene)s.

3. An aqueous curable composition according to Item 1, wherein the compound (A) is a cationic resin.

4. An aqueous curable composition according to Item 3, wherein the cationic resin is a resin obtained by a polyaddition reaction of a compound comprising two or more glycidyl groups per molecule and an amine compound.

5. An aqueous curable composition according to Item 1, wherein the compound (A) is a compound, which further comprises at least one nonionic hydrophilic group selected from the group consisting of polyoxyethylene groups, polyoxypropylene groups, and polyoxyethylene polyoxypropylene groups.

6. An aqueous curable composition according to Item 1, wherein all or some of the primary amino groups and the secondary amino groups in the compound (A) optionally neutralized with a Brønsted acid have a total molar concentration of 0.05 to 35 mol/kg.

7. An aqueous curable composition according to Item 1, wherein the compound (A) further optionally comprises a tertiary amino group; and wherein the ratio of the total number of moles of the primary to tertiary amino groups unneutralized with a Brønsted acid to the total number of moles of primary to tertiary ammonium groups obtained by neutralizing the amino groups with a Brønsted acid is (the total number of moles of the primary to tertiary amino groups)/(the total number of moles of the primary to tertiary ammonium groups)=0 to 6.0.

8. An aqueous curable composition according to Item 1, wherein the Brønsted acid used for neutralization of the compound (A) is at least one acid selected from the group consisting of methanesulfonic acids, benzenesulfonic acids, toluenesulfonic acids, dodecylbenzenesulfonic acids, hydrochloric acids, phosphoric acids, acetic acids, formic acids, and lactic acids.

9. An aqueous curable composition according to Item 1, wherein the crosslinking agent (B) is a compound obtained by reacting an (N-alkyl-N-(2-acylacyl)amino) alcohol represented by General Formula (II)

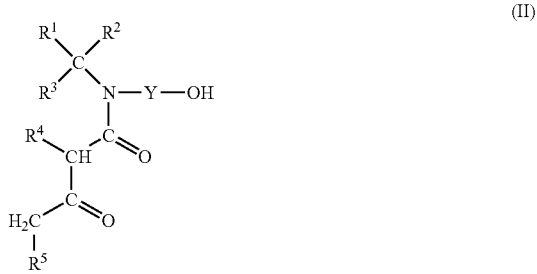

wherein $R^1$, $R^2$, $R^3$, $R^4$, $R^5$, and Y are as defined above, with a diisocyanate and/or a polyisocyanate having at least one structure selected from the group consisting of isocyanurate structures, allophanate structures, biuret structures, uretdione structures, and carbamate structures.

10. An aqueous curable composition according to Item 1, wherein the crosslinking agent (B) is a compound represented by General Formula (I), wherein $R^1$, $R^2$ and $R^3$ are each independently a hydrogen atom or $C_{1-3}$ alkyl group, and $R^4$ and $R^5$ are both hydrogen atoms.

11. An aqueous curable composition according to Item 1, wherein the crosslinking agent (B) is a compound represented by General Formula (I), wherein Y is an ethylene group optionally substituted with a $C_{1-6}$ organic group as a substituent.

12. An aqueous curable composition according to Item 1, wherein the crosslinking agent (B) is a compound comprising a propylene group optionally substituted with a $C_{1-6}$ organic group as a substituent in General Formula (I).

13. An aqueous curable composition according to Item 1, wherein the crosslinking agent (B) is a compound, which further comprises at least one nonionic hydrophilic group selected from the group consisting of polyoxyethylene groups, polyoxypropylene groups, and polyoxyethylene polyoxypropylene groups.

14. An aqueous curable composition according to Item 1, wherein the molar concentration of the (N-alkyl-N-(2-acylacyl)amino)alkyloxycarbonylamino group of General Formula (I) in the crosslinking agent (B) is 0.02 to 3 mol/kg.

15. An aqueous curable composition according to Item 1, wherein the 2-acylacyl group moiety of the group of General Formula (I) in the crosslinking agent (B) is blocked by at least one blocking agent selected from the group consisting of pyrrolidine, piperidine, morpholine, and compounds represented by General Formula (X)

wherein $R^6$ and $R^7$ are each independently a $C_{1-8}$ organic group optionally substituted with a hydrogen atom or an oxygen atom.

16. An aqueous curable composition according to Item 1, wherein the ratio of the compound (A) to the crosslinking agent (B) is such that the ratio of (N-alkyl-N-(2-acylacyl)amino)alkyloxycarbonylamino groups of General Formula (I) in the crosslinking agent (B) to the total number of moles of primary amino groups and secondary amino groups in the compound (A) is (the number of moles of the (N-alkyl-N-(2-acylacyl)amino)alkyloxycarbonylamino groups)/(the total number of moles of all or some of the primary amino groups and secondary amino groups optionally neutralized with a Brønsted acid)=0.3 to 3.

17. An aqueous curable composition according to Item 3, wherein the aqueous curable composition is used as a cationic electrodeposition coating composition.

Aqueous Curable Composition

The aqueous curable composition of the present invention comprises (A) a compound including all or some of the primary amino groups and/or secondary amino groups optionally neutralized with a Brønsted acid, and (13) a crosslinking agent, which is a compound having an (N-alkyl-N-(2-acylacyl)amino)alkyloxycarbonylamino group of General Formula (I) including a structure in which a nitrogen atom bonded to an acylacyl group is not combined with a hydrogen atom.

Compound (A)

The compound (A) includes all or some of the primary amino groups and/or secondary amino groups optionally neutralized with a Brønsted acid. The compound (A) may have a tertiary amino group and/or a quaternary ammonium group. Primary to tertiary amino groups become primary to tertiary ammonium groups when neutralized with a Brønsted acid. Among these groups, the primary to secondary amino groups and the primary to secondary ammonium groups undergo a crosslinking reaction with the (N-alkyl-N-(2-acylacyl)amino)alkyloxycarbonylamino group of the crosslinking agent (B) at room temperature or while heating, to thereby impart excellent curability of the composition of the invention.

The primary ammonium group is represented by the following Formula (XI), the secondary ammonium is Formula (XII), the tertiary ammonium is Formula (XIII), and the quaternary ammonium is Formula (XIV). X represented in Formulae (XI) to (XIV) is an acid residue of a Brønsted acid.

The compound (A) preferably has a number average molecular weight of about 60 to about 1,000,000, and more preferably about 100 to about 50,000. Examples of the compound (A) include liquid or solid low-molecular-weight compounds and resin-like high-molecular-weight compounds. The compound (A), having a number average molecular weight of more than 1,000,000, may have lowered compatibility with the crosslinking agent (B).

The number average molecular weight as used herein is determined by converting the number average molecular weight measured by gel permeation chromatography, based on the average molecular weight of standard polystyrene.

Examples of Brønsted acids used for neutralization include hydrochloric acid, sulfuric acid, phosphoric acid and like inorganic acids; benzenesulfonic acid, toluenesulfonic acid, dodecylbenzenesulfonic acid, methanesulfonic acid, and like organic sulfonic acids; formic acid, oxalic acid, acetic acid, propionic acid, butyric acid and like low-molecular-weight organic carboxylic acids; and oxyacetic acid, lactic acid, and like oxyacids. Among these, methanesulfonic acid, benzenesulfonic acid, toluenesulfonic acid, dodecylbenzenesulfonic acid, hydrochloric acid, phosphoric acid, acetic acid, formic acid, lactic acid, etc. are preferable to achieve excellent water dispersibility of the compound (A) and storage stability of the composition, etc.

The compound (A) is not particularly limited as long as it has at least two primary amino group(s) and/or secondary amino group(s) per molecule.

Usable compound (A) includes, for example, ammonia, (polyamino)alkanes, (polyamino)polyethers, polyethyleneimines, poly(aminoalkene)s, etc.

Specific examples of such compounds include about $C_2$ to about $C_{20}$ polymethylenediamines and such polymethylenediamines having an organic substituent at the N-position, such as ethylenediamine, N,N'-dimethylethylenediamine, propylenediamine, trimethylenediamine, tetramethylenediamine, pentamethylenediamine, hexamethylenediamine, heptamethylenediamine, etc.; oxyalkylene group- or polyoxyalkylene group-containing diamines, such as ethylene glycol bis(2-aminoethyl)ether, diethylene glycol bis(2-aminoethyl)ether, tripropylene glycol (2-aminoethyl)ether, etc.; about $C_3$ to about $C_{10}$ alicyclic diamines, such as 1,2-cyclohexyldiamine, 1,4-cyclohexyldiamine, etc.; about $C_6$ to about $C_{20}$ aromatic diamines, such as o-xylylenediamine, m-xylylenediamine, p-xylylenediamine, 1,2-phenylenediamine, 1,3-phenylenediamine, 1,4-phenylenediamine, 1,4-naphthylenediamine, 4,4'-diaminodiphenylmethane, 4,4'-diaminodiphenylsulfone, etc.; about $C_4$ to about $C_{20}$ polyamines and such polyamines having an organic substituent at the N-position, such as diethylenetriamine, N-ethyldiethylenetriamine, triethylenetetramine, tetraethylenepentamine, pentaethylenehexamine, and like polyethylene polyamines, etc.; about $C_3$ to about $C_{20}$ aliphatic triamines, such as 1,2,3-triaminopropane and the like; about $C_6$ to about $C_{20}$ aromatic triamines, such as 1,2,3-aminobenzene and the like; polyoxyalkylene group-containing polyamines having such a structure that at least two hydroxy groups of a compound obtained by reacting a polyol such as trimethylolpropane, pentaerythritol, or the like, with alkylene oxide (s) such as ethylene oxide and/or propylene oxide are converted to amino groups; polyamines obtained by further reacting the above-mentioned diamines, triamines, or polyamines, with alkylene oxide(s) such as ethylene oxide and/or propylene oxide; and the like.

Cationic resins can be used as the compound (A). Examples of cationic resins include, for example, resins produced by reacting epoxy group-containing compounds or resins derived from epoxy group-containing compounds with primary and/or secondary organic amines or derivatives thereof; copolymers of amino group-containing polymerizable unsaturated compounds with vinyl-based monomers; copolymers of amino group-containing polymerizable unsaturated compounds, amide group-containing polymerizable unsaturated compounds, and vinyl-based monomers; polyamide resins; cationic resins that exhibit water dispersibility when acid compounds are added thereto; resins obtained by reacting epoxy group-containing compounds or resins derived from epoxy group-containing compounds with cationizing agents; resins obtained by protonating polycondensates of polycarboxylic acids and polyamines with acids; resins obtained by protonating polyadducts of polyisocyanate compounds, polyols, and mono- or polyamines with acids; resins obtained by protonating adducts of polycarboxylic acid resins and alkyleneimines with acids; etc.

The cationic resins may be denatured with denaturants. Such denaturants include, for example, vinyl copolymers, polybutadienes, unsaturated group-containing alkyd resins, polyesters, polyurethanes, polycarbonates, polyols, polyamines, polycarboxylic acids, ε-caprolactone, derivatives thereof, etc. Such cationic resins may be further reacted with polyisocyanates when being denatured.

Preferable epoxy group-containing compounds and resins derived from epoxy group-containing compounds include those produced by using active hydrogen-containing compounds and epichlorohydrin as starting materials. Examples of active hydrogen-containing compounds include polyphenol compounds, polyether polyols, polyester polyols, polyamide amines, polycarboxylic acids, etc. Such epoxy group-containing compounds and resins derived from epoxy group-containing compounds preferably have a number average molecular weight of at least about 200, more preferably about 400 to about 4,000, and even more preferably about 800 to about 2,000.

Polyphenol compounds, which are active hydrogen-containing compounds, include, for example, 2,2-bis(4-hydroxyphenyl)propane, 4,4-dihydroxybenzophenone, 1,1-bis(4-hydroxyphenyl)ethane, 1,1-bis(4-hydroxyphenyl)isobutane, 2,2-bis(4-hydroxy-tert-butyl-phenyl)propane, bis(2-hydroxynaphthyl)methane, 1,5-dihydroxynaphthalene, bis(2,4-dihydroxyphenyl)methane, tetra-1,1,2,2-(4-hydroxyphenyl)ethane, 4,4-dihydroxydiphenylsulfone, phenol novolac, cresol novolac, etc.

Examples of usable cationic resins include the following resins (i) to (iii):

(i) adducts of epoxy group-containing compounds or resins derived from epoxy group-containing compounds with monoamines or polyamines, as described in, for example, the specification of U.S. Pat. No. 3,984,299;

(ii) adducts of epoxy group-containing compounds or resins derived from epoxy group-containing compounds with monoamines having ketiminized primary amino groups, and polyamines, as described in, for example, the specification of U.S. Pat. No. 4,017,438.

(iii) reaction products obtained by etherification of epoxy group-containing compounds or resins derived from epoxy group-containing compounds with hydroxy compounds having ketiminized primary amino groups, as described in, for example, Japanese Unexamined Patent Application Publication No. 1984-43013.

Among such cationic resins (i) to (iii), it is preferable to use cationic resins obtained by a polyaddition reaction of a compound comprising two or more glycidyl groups per molecule with an amine compound. The starting amine compound may be ketiminized.

Examples of compounds having at least two glycidyl groups per molecule include diglycidyl ether-terminated aromatic ring-containing resins that are derived from bisphenol A, such as "Epikote 828", "Epikote 1001", and "Epikote 1002" (tradenames of Japan Epoxy Resin Co., Ltd.), etc.; diglycidyl ether-type resins derived from bisphenol F, such as "Epikote 806", "Epikote 4004P", and "Epikote 4007P" (tradenames of Japan Epoxy Resin, Co., Ltd.), etc.; and polyglycidyl ether-terminated aliphatic resins such as ethylene glycol diglycidyl ether, neopentyl glycol diglycidyl ether, glycerol polyglycidyl ether, trimethylolpropane triglycidyl ether, polyethylene glycol diglycidyl ether, polypropylene glycol diglycidyl ether, etc.

Examples of amine compounds include monoamines, diamines, triamines, polyamines, etc. Monoamines include, for example, butylamine, dibutylamine, 2-ethylhexylamine, octylamine, dodecylamine, stearylamine, and like $C_{4-18}$ aminoalkanes; ethanolamine, 2-(N-methylamino)ethanol, (2-hydroxyethoxy)ethylamine, 2-amino-2-methyl-1-propanol, and like oxygen atom-containing monamino compounds; etc. Usable diamines, triamines, and polyamines include those mentioned above.

Examples of ketiminized amine compounds include ketimines obtained by reacting the primary amino group of diethylenetriamine with ketones such as methyl isobutyl ketone or the like; compounds obtained by reacting the amino group of 2-aminoethanol with ketones, and like amine derivatives in which all or some of amino groups are ketiminized. When a ketiminized amine compound is reacted with an amine compound and/or a compound having at least two glycidyl groups per molecule, it is possible to hydrolyze the ketimine moiety and thereby regenerate amino groups by adding water and, if necessary, a Brønsted acid such as acetic acid, formic acid, or the like.

The compound (A) may have cationic groups such as sulfonium groups, phosphonium groups, etc.

Such a cationic group-containing compound (A) can be synthesized by, for example, further reacting epoxy groups of an epoxy group-containing cationic resin as mentioned above with a tertiary amine salt, secondary sulfide salt, or tertiary phosphine salt following known steps.

Examples of tertiary amine salts include mixtures of tertiary amines such as triethylamine, triethanolamine, N,N-dimethylethanolamine, N-methyldiethanolamine, N,N-diethylethanolamine, N-ethyldiethanolamine, etc., with inorganic acids such as hydrochloric acid, sulfuric acid, phosphoric acid, etc.; organic sulfonic acids such as paratoluenesulfonic acid, methanesulfonic acid, etc.; low molecular-weight organic carboxylic acids such as oxalic acid, acetic acid, formic acid, propionic acid, etc.; or oxyacids such as oxyacetic acid, lactic acid, etc.

Examples of secondary sulfide salts include mixtures of sulfides such as diethylsulfide, diphenylsulfide, tetramethylenesulfide, thiodiethanol, etc., with acids as mentioned above.

Examples of tertiary phosphine salts include mixtures of phosphines such as triethylphosphine, phenyldimethylphosphine, diphenylmethylphosphine, triphenylphosphine, with acids as mentioned above.

The compound (A) may further contain nonionic hydrophilic group(s). Examples of nonionic hydrophilic groups are not particularly limited, but include polyoxyethylene groups, polyoxypropylene groups, polyoxyethylene polyoxypropylene groups, poly(N-vinylpyrrolidone) groups, poly(vinylformamide) groups, poly(acrylamide) groups, poly(N-alkylacrylamide) groups, poly(N,N-dialkylacrylamide) groups, etc. Among these, polyoxyethylene groups, polyoxypropylene groups, polyoxyethylene polyoxypropylene groups, and like polyoxyalkylene groups are preferred since they are easily introduced.

Methods for introducing a polyoxyalkylene group include, for example, a method of reacting a polyalkylene glycol compound, an epoxy group-containing compound and/or a resin derived from an epoxy group-containing compound, and a polyisocyanate; a method of reacting a polyalkylene glycol compound, a cationic resin, and a polyisocyanate; and a method of reacting a polyalkylene glycol compound, an epoxy group-containing compound and/or a resin derived from an epoxy group-containing compound, a cationic resin, and a polyisocyanate. Examples of polyalkylene glycol compounds include polyethylene glycol, polyethylene glycol monoalkyl ether, and like hydroxyl group-containing polyoxyethylene derivatives; polypropylene glycol, polypropylene glycol monoalkyl ether, and like hydroxyl group-containing polyoxypropylene derivatives; polyethylene polypropylene glycol, polyethylene polyoxypropylene glycol monoalkyl ether, and like hydroxyl group-containing polyoxyethylene polyoxypropylene derivatives; etc.

The compound (A) into which nonionic hydrophilic group(s) are introduced can further react with monoamines, diamines, triamines, polyamines or like amine compounds, or such ketimines after the introduction of such group(s).

In view of attaining sufficient curability of the composition and water resistance of the coating film thereof, all or some of the primary amino groups and secondary amino groups optionally neutralized with Brønsted acid in the compound (A) preferably have a total molar concentration of about 0.05 to about 35 mol/kg, and more preferably about 0.1 to about 25 mol/kg.

The compound (A) likely includes a tertiary amino group in addition to the primary amino group and/or the secondary amino group. In such a case, from the viewpoint of excellent composition stability, it is preferable that the ratio of the total number of moles of the primary to tertiary amino groups unneutralized with Brønsted acid to the total number of moles of the primary to tertiary ammonium groups neutralized with the Brønsted acid be (the total number of moles of primary to tertiary amino groups)/(the total number of moles of primary to tertiary ammonium groups)=about 0 to about 6.0.

The compound (A) can be diluted with a solvent to easily mix with the crosslinking agent (B). Examples of solvents include water and/or an organic solvent. The dilution of the compound (A) may be a solution or a dispersion. Usable organic solvents include butanol, ethylene glycol, and like alcohols; tetrahydrofuran, dipropylene glycol dimethyl ether, propylene glycol monomethyl ether, and like ethers; ethyl acetate, butyl acetate, and like esters; methyl isobutyl ketone, methyl ethyl ketone, and like ketones; N-methyl-2-pyrrolidinone, N,N-dimethylacetamide, and like amides.

Crosslinking Agent (B)

The crosslinking agent (B) is a compound comprising an (N-alkyl-N-(2-acylacyl)amino)alkyloxy carbonylamino group represented by General Formula (I)

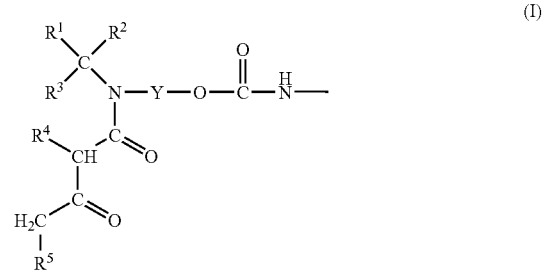

(I)

wherein $R^1$, $R^2$ and $R^3$ are each independently a hydrogen atom or $C_{1-7}$ alkyl group, $R^4$ and $R^5$ are each independently a hydrogen atom or $C_{1-16}$ organic group, and Y is a straight $C_{1-6}$ alkylene group that is optionally substituted with a $C_{1-6}$ organic group as a substituent.

The compound having the (N-alkyl-N-(2-acylacyl)amino) alkyloxycarbonylamino group of General Formula (I) is suitably used as a crosslinking agent since the group of General Formula (I) has excellent reactivity with the primary amino group and secondary amino group of the compound (A).

The $C_{1-7}$ alkyl group represented by $R^1$, $R^2$ and $R^3$ in the group of General Formula (I) may be, methyl, ethyl, propyl, butyl, pentyl, hexyl, heptyl, or an alkyl group that is isomeric therewith. When the alkyl group has 8 or more carbon atoms, the production of the starting compound of General Formula (II) may require a long period of time. In order to reduce the production period for the compound of General Formula (II), an alkyl group having 1 to 3 carbon atoms is preferable.

The $C_{1-16}$ organic group represented by $R^4$ and $R^5$ may be, for example, methyl, ethyl, propyl, butyl, pentyl, hexyl, heptyl, octyl, nonyl, decyl, undecyl, dodecyl, tridecyl, tetradecyl, pentadecyl, hexadecyl, or an alkyl group that is isomeric therewith; phenyl, tolyl, or like aralkyl group; or a group in which such an alkyl group, aralkyl group, or the like contains an oxygen atom. When the organic group has 17 or more carbon atoms, the production of the starting compound of General Formula (II) may require a long period of time.

The $C_{1-6}$ straight alkylene group represented by Y may be ethylene, propylene, butylene, heptylene, or hexylene. The $C_{1-6}$ organic group that may be possessed by the straight alkylene group may be, for example, methyl, ethyl, isopropyl, or like alkyl group; methoxy, ethoxy, or like alkoxy group; or the like. When the alkylene group or organic group has 8 or more carbon atoms, the production of the starting compound of General Formula (II) may require a long period of time.

The compound having a group of General Formula (I), i.e., a crosslinking agent (B), preferably has a number average molecular weight of about 450 to about 1,000,000, and more preferably about 900 to about 50,000. Such a compound includes a liquid or solid low-molecular-weight compound or a resin-like high-molecular-weight compound. When the number average molecular weight of the compound is less than 450, the compound may have lower curability, whereas when the number average molecular weight of the compound exceeds 1,000,000, the compound may have lower compatibility with the compound (A).

The compound having the group of General Formula (I) is not particularly limited, and can be prepared by, for example, the following methods (1) to (4).

(1) A method of reacting an (N-alkyl-N-(2-acylacyl) amino) alcohol represented by General Formula (II),

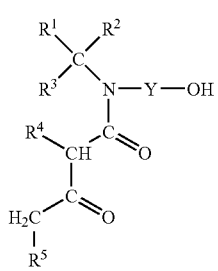

(II)

wherein $R^1$, $R^2$, $R^3$, $R^4$, $R^5$, and Y are as defined above, with a polyisocyanate having at least one structure selected from the group consisting of diisocyanate and/or isocyanurate structures, allophanate structures, biuret structures, uretdione structures, and carbamate structures.

(2) A method of reacting an (N-alkyl-N-(2-acylacyl) amino) alcohol represented by General Formula (II) with an isocyanate group-containing vinyl-based polymer having a number average molecular weight of about 1,000 to about 500,000.

(3) A method of homopolymerizing or copolymerizing with other vinyl-based monomer(s) an adduct obtained by reacting an (N-alkyl-N-(2-acylacyl)amino) alcohol represented by General Formula (II) with an isocyanate group-containing vinyl-based polymer.

(4) A method of homopolymerizing or copolymerizing with other vinyl-based monomer(s) an adduct obtained by reacting an (N-alkyl-N-(2-acylacyl)amino) alcohol represented by General Formula (II) and a hydroxy group-containing vinyl-based monomer with a diisocyanate and/or polyisocyanate.

The compound of General Formula (II) used in the above-described production methods (1) to (4) is not particularly limited, and obtained by, for example, reacting a compound represented by General Formula (III),

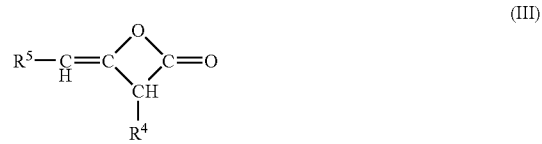

(III)

wherein $R^4$ and $R^5$ are as defined above, and a compound represented by General Formula (IV),

(IV)

wherein $R^1$, $R^2$, $R^3$, and Y are as defined above.

Examples of compounds represented by General Formula (III) include diketene (ketene dimer), dialkyl ketene (alkyl ketene dimer), diphenyl ketene (phenylketene dimer), etc. Among these, diketene (ketene dimer), in which $R^4$ and $R^5$ are both halogen atoms, is readily available and thus preferable.

Examples of compounds represented by General Formula (IV) include 2-(methylamino)ethanol, 2-(ethylamino)ethanol, 2-(propylamino)ethanol, 2-(isopropylamino)ethanol, 2-(butylamino)ethanol, 2-(t-butylamino)ethanol, and like 2-(alkylamino)ethanol derivatives; 1-(methylamino)-2-propanol, 1-(ethylamino)-2-propanol, 1-(isopropylamino)-2-propanol, 1-(butylamino)-2-propanol, 1-(t-butylamino)-2-propanol, and like 1-(alkylamino)-2-propanol derivatives; 1-(methylamino)-2-butanol, 1-(ethylamino)-2-butanol, 1-(isopropylamino)-2-butanol, 1-(butylamino)-2-butanol, 1-(t-butylamino)-2-butanol, and like 1-(alkylamino) butanol derivatives; 3-(methylamino)-1-propanol, 4-(methylamino)-1-butanol, 6-(ethylamino)-1-hexanol and like ω-(alkylamino)-1-alkanol derivatives; diethanolamine, diisopropanolamine, and like dialcohol-type amine derivatives. Among such compounds, 2-(methylamino)ethanol, 2-(ethylamino) ethanol, 2-(propylamino)ethanol, 2-(isopropylamino)ethanol, 2-(butylamino)ethanol, in which Y is a ethylene group, are preferable from the viewpoint of reduction of the production time for the compound of General Formula (II).

The reaction temperature of the compound represented by General Formula (III) and the compound represented by General Formula (IV) is not particularly limited, but is usually about −40° C. to about 100° C. Overly low temperatures require too much time to complete the reaction, whereas high temperatures cause the polymerization reaction of diketene to easily occur. Therefore, heating temperatures of about −20° C. to about 30° C. are preferable. A reaction solvent can be used in the reaction as necessary. Reaction solvents are not particularly limited, and include, for example, acetonitrile and like nitrile-based solvents; tetrahydrofuran and like ether-based solvents; N-methylpyrrolidone and like amide-based solvents; ethyl acetate and like ester solvents; acetone, 2-butanone and like ketone solvents; methanol and like alcohol-based solvents, etc.

The reaction of the compound represented by General Formula (III) and the compound represented by General Formula (IV) may be conducted, for example, by first introducing the compound represented by General Formula (III) into a reactor, and then adding thereto the compound represented by General Formula (IV) dropwise; by first introducing the compound represented by General Formula (IV) into a reactor, and then adding thereto the compound represented by General Formula (III) dropwise; or by simultaneously adding the compound represented by General Formula (III) and the compound represented by General Formula (IV) dropwise. In such cases, the compound represented by General Formula (III) and the compound represented by General Formula (IV) may be previously introduced into a reactor as necessary. To achieve high yield and excellent stability of the product, the compound represented by General Formula (III) and the compound represented by General Formula (IV) may be simultaneously added dropwise under such conditions that the compound represented by General Formula (III) is always present in slight excess during the reaction.

The reaction ratio of the compound represented by General Formula (III) and the compound represented by General Formula (IV) is not particularly limited, but the amount of the compound represented by General Formula (IV) is preferably about 0.5 to about 1.5 moles, and more preferably about 0.9 to about 1.1 moles per mole of the compound of General Formula (III).

The compound of General Formula (II) may be used in the reaction after increasing its purity or before increasing its purity. When the compound represented by General Formula (II) is prepared in the presence of a solvent, some or all of the solvent may be removed before the reaction; or some or all of the solvent may be removed and a different type of solvent may be further added before the reaction. When a catalyst is used in the production of the compound of General Formula (II), some or all of the catalyst may be neutralized or removed by adsorption using an adsorbent, before the reaction.

Examples of compounds represented by General Formula (II) include 2-(N-methyl-N-(2-lauroyl lauroyl)amino)ethanol, 2-(N-methyl-N-(2-acetylacetyl)amino)ethanol, 2-(N-ethyl-N-(2-acetylacetyl)amino)ethanol, 2-(N-propyl-N-(2-acetylacetyl)amino)ethanol, 2-(N-isopropyl-N-(2-acetylacetyl)amino)ethanol, 2-(N-butyl-N-(2-acetylacetyl)amino)ethanol, 2-(N-isobutyl-N-(2-acetylacetyl)amino)ethanol, 2-(N-t-butyl-N-(2-acetylacetyl)amino)ethanol, 3-(N-methyl-N-(2-acetylacetyl)amino)-1-propanol, 1-(N-methyl-N-(2-acetylacetyl)amino)-2-propanol, etc.

Diisocyanates used in the production methods (1) and (4) include, for example, diphenylmethane-4,4'-diisocyanate (MDI), 1,5-naphthalene diisocyanate, tolylene diisocyanate (TDI), xylylene diisocyanate, 1,4-tetramethylene diisocyanate, 2-methyl-1,5-diisocyanate pentane (MPDI), 1,6-diisocyanate hexane (HDI), 2,2,4-trimethyl-1,6-hexamethylene diisocyanate (TMDI), lysine diisocyanate, 5-isocyanate-1-(isocyanatemethyl)-1,3,3-trimethylcyclohexane (IPDI: isophorone diisocyanate (abbreviation)), dicyclohexylmethane-4,4'-diisocyanate (HMDI), m-tetramethylxylylene diisocyanate (TMXDI), norbornane diisocyanate, di(isocyanatemethyl)norbornane, and like $C_{4-25}$ compounds having a number average molecular weight of 150 to 450. Such diisocyanates can be used in combinations of two or more.

Polyisocyanates used in the production methods (1) and (4) are not limited, but include, for example, polyisocyanates having at least one structure selected from the group consisting of isocyanurate structures, allophanate structures, biuret structures, uretdione structures, and carbamate structures. In view of attaining low viscosity, it is preferable to use polyisocyanates having a number average molecular weight of about 500 to about 500,000, and an isocyanate group content of about 0.1 to about 40% by weight. These polyisocyanates can be used in combinations of two or more.

The isocyanurate structure is represented by following Formula (V), the allophanate structure is Formula (VI), the biuret structure is Formula (VII), the uretdione structure is Formula (VIII), and the carbamate structure is Formula (IX).

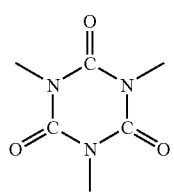

(V)

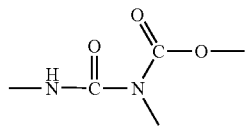

(VI)

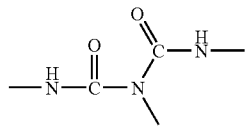

(VII)

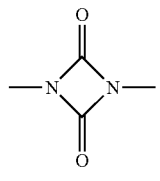

(VIII)

(IX)

Polyisocyanates having an isocyanurate structure or allophanate structure can be made from the above-mentioned diisocyanate and/or known polyisocyanate using a catalyst or the like, according to a known method. Polyisocyanates with a biuret structure can be obtained by reacting the above-mentioned diisocyanate and/or known polyisocyanate with water. Polyisocyanates with an uretdione structure can be made from the above-mentioned diisocyanate and/or known polyisocyanate, and as required, a hydroxyl group-containing compound, etc., using a catalyst or the like, according to a known method. Polyisocyanates with a carbamate structure can be obtained by reacting a hydroxyl group-containing compound with the above-mentioned diisocyanate, and/or known polyisocyanate.

The hydroxyl group-containing compounds are not particularly limited, and include, for example, methanol, ethanol, propanol, butanol, pentanol, hexanol, cyclohexanol, heptanol, octanol, nonanol, decanol, undecanol, dodecanol, tridecanol, tetradecanol, pentadecanol, hexadecanol, heptadecanol, octadecanol and like alkanols; propylene glycol monomethyl ether, propylene glycol monopropyl ether, ethylene glycol monobutyl ether, polyethylene glycol monomethyl ether, polyethylene glycol monoethyl ether, polypropylene glycol monomethyl ether, polyoxyethylene polyoxypropylene monomethyl ether, and like ether group-containing monools; ring-opening-adducts of hydroxyl group-containing compounds such as ethylene glycol, propylene glycol, polyethylene glycol, polypropylene glycol, butanediol, polytetramethylene glycol, methylpropanediol, pentanediol, methyl pentanediol, hexanediol, neopentylglycol, 2-butyl-2-ethyl-1,3-propanediol, 2,2'-diethyl-1,3-propanediol, 1,4-cyclohexane dimethanol, tricyclodecanedimethanol, 2-ethyl-1,3-hexanediol, 2,2,4-trimethyl-1,3-pentanediol, hydroxypivalic acid-neopentyl glycol ester, dimethylolpropanoic acid, dimethylolbutanoic acid, trimethylolethane, trimethylolpropane, trimethylolbutane, trimethyloloctane, glycerin, pentaerythritol, with ethylene oxide, propylene oxide, tetrahydrofuran, lactone, and/or cyclo carbonate; ring-opening adducts of amino group-containing compounds with ethylene oxide, propylene oxide, tetrahydrofuran, lactone, and/or cyclo carbonate; reaction products of a compound containing an amino group and a hydroxy group per molecule, with an epoxy group-containing compound; reaction products of a compound containing both of an amino group and a hydroxy group per molecule with a polyisocyanate; hydroxyl group-containing polyester resin, hydroxyl group-containing polyurethane resin, hydroxyl group-containing polycarbonate resin, hydroxyl group-containing vinyl-based polymer, epoxy resin, and like polyols.

Hydroxy group-containing vinyl-based polymers, which are the above-mentioned hydroxyl group-containing compounds, can be produced by homopolymerizing a hydroxy group-containing vinyl-based monomer or copolymerizing the monomer with other vinyl-based monomer(s).

Examples of usable polyisocyanates having at least one structure selected from the group consisting of isocyanurate structures, allophanate structures, biuret structures, uretdione structures, and carbamate structures include commercially available products.

Hydroxy group-containing vinyl-based monomers to be used in production method (4) and a hydroxy group-containing vinyl-based polymer production are not particularly limited, and include, for example, adducts of 2-hydroxyethyl (meth)acrylate, hydroxypropyl(meth)acrylate, hydroxybutyl (meth)acrylate or hydroxyalkyl(meth)acrylate, with ε-caprolactone.

Examples of the isocyanate group-containing vinyl-based monomers used in production method (3) are not particularly limited, and include 2-isocyanate ethyl (meth)acrylate, and like isocyanate alkyl(meth)acrylates; adducts of a diisocyanate with a hydroxy group-containing vinyl-based monomer selected from 2-hydroxyethyl(meth)acrylate, hydroxypropyl (meth)acrylate, hydroxybutyl(meth)acrylate, and the adducts of hydroxyalkyl(meth)acrylate with ε-caprolactone; and the like.

Isocyanate group-containing vinyl-based polymers used in production method (2) may be obtained by homopolymerizing an isocyanate group-containing vinyl-based monomer, or copolymerizing the monomer with at least one other vinyl-based monomer; or by an addition reaction of a hydroxy group-containing vinyl-based polymer with a diisocyanate and/or polyisocyanate.

Other vinyl-based monomers to be used in production methods (3) and (4), a hydroxyl group-containing vinyl-based polymer production, and an isocyanate group-containing vinyl-based polymer production are not particularly limited, and include known products. Examples of such products include those described in the following Items (1) to (22).

(1) $C_{1-30}$ alkyl esters or cycloalkyl esters of acrylic acid and methacrylic acid, such as methyl(meth)acrylate, ethyl (meth)acrylate, n-propyl(meth)acrylate, isopropyl (meth)acrylate, n-butyl(meth)acrylate, i-butyl (meth)acrylate, t-butyl(meth)acrylate, hexyl(meth)acrylate, 2-ethylhexyl(meth)acrylate, n-octyl(meth)acrylate, decyl (meth)acrylate, lauryl(meth)acrylate, stearyl(meth)acrylate, cyclohexyl(meth)acrylate, isobornyl(meth)acrylate, etc.;

(2) $C_{2-18}$ alkoxyalkyl esters of acrylic acid and methacrylic acid, such as methoxybutyl(meth)acrylate, methoxyethyl (meth)acrylate, ethoxybutyl(meth)acrylate, etc.;

(3) vinyl aromatic compounds, such as styrene, α-methylstyrene, vinyltoluene, p-chlorostyrene, etc.;

(4) $C_{2-8}$ hydroxyalkyl esters of acrylic acid and methacrylic acid, such as 2-hydroxyethyl(meth)acrylate, hydroxypropyl(meth)acrylate, hydroxybutyl(meth)acrylate, etc.;

(5) adducts of hydroxyalkyl esters of acrylic acid and methacrylic acid with ε-caprolactone, such as, for example, "Placcel FM-3" (tradename of Daicel Chemical Industries, Ltd.), etc.;

(6) polyalkylene glycol mono(meth)acrylates, such as mono(meth)acrylic-acid ester of polyethylene glycol, mono (meth)acrylic-acid ester of polypropylene glycol, mono (meth)acrylic-acid ester of polyethylene glycol polypropylene glycol, etc.; alkyl polyoxyalkylene (meth)acrylates, such as methylpolyoxyethylene (meth)acrylate, methyl polyoxypropylene(meth)acrylate, methylpolyoxyethylene polyoxypropylene (meth)acrylate, etc.; and hydroxyalkyl vinyl ethers;

(7) epoxy group-containing unsaturated monomers, such as glycidyl(meth)acrylate, diglycidyl fumarate, allyl glycidyl ether, ε-caprolactone-modified glycidyl (meth)acrylate, β-methylglycidyl(meth)acrylate, 3,4-epoxycyclohexylmethyl(meth)acrylate, etc.;

(8) perfluoroalkyl esters of acrylic acid and methacrylic acid, such as perfluorobutylethyl(meth)acrylate, perfluoroisononylethyl(meth)acrylate, perfluorooctylethyl (meth)acrylate, etc.;

(9) olefins, such as ethylene, propylene, butylene, pentene, etc.;

(10) diene compounds, such as butadiene, isoprene, chloroprene, etc.;

(11) fluoroolefins, such as trifluoroethylene, tetrafluoroethylene, vinylidene fluoride, etc.;

(12) vinyl esters and propenyl esters of $C_{1-20}$ fatty acids, such as vinyl acetate, vinyl propionate, vinyl caprate, "VeoVa monomer" (tradename of Shell Chemical Co.; vinyl ester of a branched-chain higher fatty acid), isopropenyl acetate, etc.; and vinyl ethers, such as ethyl vinyl ether, n-propyl vinyl ether, isopropyl vinyl ether, butyl vinyl ether, octyl vinyl ether, cyclohexyl vinyl ether, phenyl vinyl ether, benzyl vinyl ether, etc.;

(13) carboxy-containing unsaturated monomers, such as acrylic acid, methacrylic acid, crotonic acid, itaconic acid, maleic acid, fumaric acid, 2-carboxyethyl(meth)acrylate, 2-carboxypropyl(meth)acrylate, 5-carboxypentyl (meth) acrylate, etc.;

(14) hydrolyzable alkoxysilyl group-containing unsaturated monomers, such as vinyltriethoxysilane, vinyltrimethoxysilane, vinyltris(methoxyethoxy)silane, γ-methacryloyloxypropyltrimethoxysilane, 2-styrylethyltrimethoxysilane, etc.;

(15) nitrogen-containing alkyl(meth)acrylates, such as N,N-dimethylaminoethyl(meth)acrylate, N-t-butylaminoethyl(meth)acrylate, etc.;

(16) polymerizable amides, such as acrylamide, methacrylamide, N-methyl(meth)acrylamide, N-ethyl (meth) acrylamide, N-methylol (meth) acrylamide, N-methoxymethyl (meth) acrylamide, N-butoxymethyl (meth) acrylamide, N,N-dimethyl(meth) acrylamide, N,N-dimethylaminopropyl (meth)acrylamide, N,N-dimethylaminoethyl(meth) acrylamide, diacetone acrylamide, etc.; and nitrogen-containing unsaturated monomers such as 2-vinylpyridine, 1-vinyl-2-pyrrolidone, 4-vinylpyridine, (meth)acryloylmorpholine, etc.;

(17) sulfonic acid monomers such as vinylsulfonic acid, methallylsulfonic acid, sulfoethyl(meth)acrylate, styrenesulfonic acid, 2-acrylamide-2-methylpropanesulfonic acid, etc., and salts thereof;

(18) esters of hydroxyl group-containing unsaturated monomers with phosphoric acid compounds, such as 2-(meth)acryloyloxyethyl acid phosphate;

(19) phosphoric acid group-containing unsaturated monomers, such as products obtained by adding phosphoric acid compounds to epoxy groups of glycidyl(meth)acrylate or the like;

(20) polymerizable nitriles, such as acrylonitrile, methacrylonitrile, etc.;

(21) polymerizable amines, such as allylamine and the like; and

(22) acid anhydride monomers, such as maleic anhydride, itaconic anhydride, etc.

Vinyl-based polymers can be obtained by homopolymerizing or copolymerizing a vinyl-based monomer. Known polymerization methods, including such methods as radical polymerization, coordination polymerization, group transfer polymerization (functional group transfer polymerization), ATRP (atom transfer polymerization), chain transfer polymerization, etc. can be used. Known polymerization forms including, for example, homogeneous polymerization in an organic solvent and/or an aqueous solvent, batch polymerization, emulsion polymerization, dispersion polymerization, suspension polymerization, etc. are usable. The number average molecular weight of the vinyl-based polymers obtained by polymerization is not particularly limited, but preferably in a range of about 1,000 to about 1,000,000.

When reacting the compound represented by General Formula (II) with a diisocyanate and/or a polyisocyanate; or General Formula (II) with an isocyanate group-containing vinyl-based polymer; or General Formula (II) with an isocyanate group-containing vinyl-based monomer; or General Formula (II) and a hydroxy group-containing vinyl-based monomer with a diisocyanate, and/or a polyisocyanate; in general, these compounds are first mixed and then subjected to the reaction at room temperature or while heating. In such cases, the amount of the isocyanate group is not particularly limited, but is preferably from about 0.2 to about 5 moles, and more preferably from about 1 to about 2 moles, per mole of the compound represented by General Formula (II). When heated, the heating temperature is preferably from about 40° C. to about 220° C., and more preferably from about 50° C. to about 180° C., since overly low temperatures slow the progress of the reaction, whereas overly high temperatures easily cause side effects.

When reacting the compound represented by General Formula (II) with a diisocyanate and/or polyisocyanate, known organic solvents can be used as a solvent, if necessary. In such cases, aprotic solvents, and more preferably, ester-based solvents, ether-based solvents, N-alkylamide-based solvents, ketone solvents, etc. are preferably used. The amount of solvent to be used is not particularly limited, but is preferably not more than 5 times the weight of the compound having a group represented by General Formula (I), since too many solvents reduce the economic efficiency.

A catalyst may be used to promote the reaction. The catalyst may be at least one member selected from the group consisting of Brønsted acid catalysts, base catalysts, and Lewis acid catalysts, among which Lewis acid catalysts are preferable since they have high catalytic performance.

Usable Lewis acid catalysts are not limited. Titanium tetraalkoxides, titanium tetrahalides, and like titanium compounds; dialkyltin oxides, dialkyltin dicarboxylates, monoalkyltin tricarboxylates, tin dicarboxylates, tin tetrachloride, and like tin compounds; zirconium tetraalkoxides, zirconium tetrahalides, and like zirconium compounds; zinc dicarboxylates, zinc halides, and like zinc compounds; aluminium compounds; lead compounds; bismuth compounds; antimony compounds; metal acetylacetonate compounds; clay, acid clay, activated clay, silica, alumina, zeolite, cation exchange resins, and like solid acid catalysts; etc., are preferred from a viewpoint of reaction speed. The amount of Lewis acid catalyst to be added is not limited, but when using a catalyst other than solid acid catalysts, the amount thereof is preferably about 0.01 to about 10 moles per mol of the compound of General Formula (II). When using a solid acid catalyst, the amount thereof is preferably about 0.1 to about 500 parts by weight.

When a catalyst is used for producing the compound having the group represented by General Formula (I), some or all of the catalyst may be neutralized or removed by absorption using an absorbent. When neutralizing the catalyst, an acid catalyst is neutralized with a basic compound, and a base catalyst is neutralized with an acidic compound. Usable adsorbents are not limited, and include, for example, acid clay, activated clay, alumina, silica, zeolite, ion exchange resins, acid inorganic compounds, basic inorganic compounds, etc.

The crosslinking agent (B), which is a compound having the group of General Formula (I), can be mixed before increasing its purity or after increasing its purity with the compound (A). When the compound having the group of General Formula (I) is produced in the presence of a catalyst, some or all of the catalyst may be removed before the compound is mixed with the compound (A); or some or all of the catalyst may be removed, followed by a further addition of a different solvent before the compound is mixed with the compound (A). In such cases, a known organic solvent and water can be used as a solvent.

The compound having the group of General Formula (I) may have nonionic hydrophilic group(s). Nonionic hydrophilic groups are not particularly limited, but include, for example, polyoxyethylene groups, polyoxypropylene groups, polyoxyethylene polyoxypropylene groups, poly(N-vinylpyrrolidone) groups, poly(vinylformamide) groups, poly(acrylamide) groups, poly(N-alkyl acrylamide) groups, and poly(N,N-dialkyl acrylamide) groups. Among these, polyoxyethylene groups, polyoxypropylene groups, and polyoxyethylene polyoxypropylene groups are preferred since they are easily introduced.

The steps for introducing a nonionic hydrophilic group into the compound having the group of General Formula (I) include, for example, reacting the compound represented by General Formula (II) with a diisocyanate and/or a polyisocyanate, or reacting the compound represented by General Formula (II) with an isocyanate group-containing vinyl-based polymer in the reaction system in the presence of polyethylene glycol, polypropylene glycol, polyethylene glycol polypropylene glycol, and like polyalkylene glycols; polyethylene glycol monomethyl ether, polypropylene glycol monomethyl ether, polyethylene glycol polypropylene glycol monomethyl ether, and like polyalkylene glycol monoalkyl ethers; or using diisocyanates previously having a polyoxyethylene group, polyoxypropylene group, or polyoxyethylene polyoxypropylene group; polyisocyanates; or isocyanate group-containing vinyl-based polymers. When reacting the compound represented by General Formula (II) with an isocyanate group-containing vinyl-based polymer, the alkyl polyoxyalkylene(meth)acrylate is previously copolymerized to produce an isocyanate group-containing vinyl-based polymer. Alkyl polyoxyalkylene (meth)acrylates are copolymerized when homopolymerizing adducts of an (N-alkyl-N-(2-acylacyl)amino)alcohol represented by General Formula (II) and an isocyanate group-containing vinyl-based monomer or copolymerizing the adducts with other vinyl-based monomer(s); or when homopolymerizing adducts of an (N-alkyl-N-(2-acylacyl)amino)alcohol represented by General Formula (II) and a hydroxy group-containing vinyl-based monomer with a diisocyanate and/or a polyisocyanate or copolymerizing the adducts with other vinyl-based monomer(s).

In view of attaining sufficient composition curability and water resistance of the coating film, the (N-alkyl-N-(2-acylacyl)amino)alkyloxy carbonyl amino group represented by General Formula (I) in the crosslinking agent (B) preferably has a molar concentration of about 0.02 to about 3 mol/kg, and more preferably about 0.1 to about 2 mol/kg.

The use of the 2-acylacyl group moiety of General Formula (I) (in the crosslinking agent (B)) that is partially or fully blocked by a blocking agent as the crosslinking agent (B) improves the storage stability of the one-component version of the present invention composition.

The blocking agent is added to the 2-acylacyl group moiety of General Formula (I) of the crosslinking agent (B) when dispersed in water, but is eliminated due to the change in temperatures or pH, or the evaporation of the solvent, etc. at the time of application. The group of General Formula (I) of the crosslinking agent (B) is regenerated by the elimination of the blocking agent, and undergoes a crosslinking reaction with the primary amino group and/or secondary amino group of the compound (A).

Examples of the blocking agent include pyrrolidine, piperidine, morpholine, and compounds represented by General Formula (X),

(X)

wherein $R^6$ and $R^7$ are each independently a $C_{1-8}$ organic group optionally substituted with a hydrogen atom or an oxygen atom. Such blocking agents selected from those mentioned above can be used singly or in combinations of two or more.

The $C_{1-8}$ organic group optionally substituted with oxygen atom(s), which is represented by $R^6$ and $R^7$ in General Formula (X) may be, for example, methyl, ethyl, propyl, butyl, pentyl, hexyl, heptyl, octyl, or an alkyl group that is isomeric therewith; 2-hydroxyethyl, 2-hydroxypropyl, 3-hydroxypropyl, a 2-hydroxyethoxyethyl group, or the like.

Examples of the blocking agent of General Formula (X) include n-propylamine, n-butylamine, diethylamine, dipropyl amine, ethanolamine, diethanolamine, 2-amino-2-methylethanol, isopropanolamine, diisopropanolamine, 2-amino-2-methylpropanol, (2-hydroxyethoxy)ethylamine, etc.

The crosslinking agent (B1) in which N-(2-acylacyl)amino group is blocked can be produced, for example, by first mixing the compound having the group represented by General Formula (I) and the compound represented by General Formula (X), and then reacting the mixture at room temperature or while heating. The amount of the compound of General Formula (X) is not particularly limited, but preferably about 0.2 to about 5 moles, and more preferably about 0.5 to about 2 moles, per mol of the compound of General Formula (I). In general, heating is preferably carried out at about 30° C. to about 160° C., but when the heating temperature is too low, the reaction rate becomes low, whereas when the heating temperature is too high, side effects are likely to be caused. Therefore, heating temperatures of about 40° C. to about 120° C. are more preferable. The reaction may be promoted by removing water from the reaction system.

The compound having the group of General Formula (I) can be diluted with solvents to easily mix with the compound (A). Examples of solvents include water and/or organic solvents. The dilution of the compound having the group of General Formula (I) may be solutions or dispersions. Organic solvents are not particularly limited, and include, for example, acetonitrile, and like nitrile-based solvents; tetrahydrofuran, and like cyclic ethers; dipropylene glycol dimethyl ether, and like non-cyclic ethers; propylene glycol monopropyl ether, ethylene glycol monobutyl ether, and like alkylene glycol monoalkyl ethers; poly(alkylene glycol)monoalkyl ethers such as dipropylene glycol monopropyl ether, and like ether-based solvents; N-methylpyrrolidone, and like amide-based solvents; ethyl acetate, and like ester-based solvents; acetone, 2-butanone, and like ketone-based solvents; methanol, 2-ethylhexanol, 2-ethyl-1,3-hexanediol, and like alcohol-based solvents; 2-(N,N-dimethylamino)ethanol, 2-amino-2-methyl-1-propanol, morpholine, and like amine-based solvents. These organic solvents can be used alone or in combinations of two or more.

When the compound having the group of General Formula (I) is diluted with water and/or an organic solvent, the amount of the compound is preferably 10 wt. % or more, and more preferably 50 wt. % or more. When the amount of the compound is excessively low, the entire amount of the dilution becomes excessively large, resulting in low production efficiency.

It is presumed that, unlike the compound in which a hydrogen atom is bonded with a nitrogen atom combined with a 2-acylacyl group, since the compound having the group of General Formula (I) includes a hydrogen atom which is not bonded with a nitrogen atom combined with a 2-acylacyl group, the compound itself and the dilution thereof are likely to be in liquid form at room temperature and have excellent compatibility with the compound (A), resulting in easy production of the aqueous curable composition.

The viscosity of the compound having the group of General Formula (I), or the dilution thereof is not particularly limited. The medium for the dilution is not particularly limited. The compound having the group of General Formula (I) is diluted using a dilution medium to a concentration of 10 to 100 wt. %, and the viscosity thereof is measured at 20° C. using a C-type Brookfield rotational viscometer according to JIS K7117-1. In general, to enhance the production efficiency of the aqueous curable composition mixed with the compound (A), the viscosity at 20° C. is preferably about 30,000 Pa·s or less, and more preferably about 3,000 Pa·s or less. The viscosity is measured using the lowest-possible number spindle so that the measurement value at 1 rpm is within the range of 20 to 95% of full scale. When a viscosity measured using a spindle No. 1 indicates a value less than 20% of full scale, the result is defined as a viscosity of less than 16 Pa·s. When a viscosity measured using a spindle No. 7 indicates a value exceeding 95% of full scale, the result is defined as a viscosity of more than 30,000 Pa·s.

As the dilution medium, at least one medium selected from the group consisting of water and organic solvents, including butanol, ethylene glycol and like alcohols; tetrahydrofuran, dipropylene glycol dimethyl ether, propylene glycol monomethyl ether, and like ethers; ethyl acetate, butyl acetate, and like esters; methyl isobutyl ketone, methyl ethyl ketone, and like ketones; N-methyl-2-pyrrolidinone, N,N-dimethylacetamide, and like amides; etc. can be used.

Preparation and Application of Aqueous Curable Composition

The aqueous curable composition of the present invention can be prepared by mixing the compound (A) or the dilution thereof, with the compound having a group represented by General Formula (I), i.e., the crosslinking agent (B), or the dilution thereof by a known method such as stirring, shaking, etc. Water and/or an organic solvent may be added to mix with the composition. The mixing temperature is not particularly limited, but it is preferable to mix the composition in the vicinity of room temperature in view of ease of production of the aqueous curable composition. Examples of organic solvents to be used include those used for the dilution of the compound (A) or the compound having the group of General Formula (I).

The ratio of the compound (A) and the crosslinking agent (B) is preferably such that the ratio of the (N-alkyl-N-(2-acylacyl)amino)alkyloxycarbonylamino group of General Formula (I) in the crosslinking agent (B) to the total number of moles of some or all of the primary amino groups and secondary amino groups optionally neutralized with Brønsted acid in the compound (A) is (the number of moles of (N-alkyl-N-(2-acylacyl)amino)alkyloxycarbonylamino groups)/(the total number of moles of the primary amino groups and secondary amino groups)=about 0.3 to about 3, more preferably about 0.5 to about 2. The composition having a ratio of less than 0.3 or exceeding 3 is not preferred since the curability of the composition likely becomes low.

The aqueous curable composition of the present invention can be used as the one-component composition or the two-component composition, and gradually increases its viscosity depending on the types or the combinations of the compound (A) and the compound having the group of General Formula (I), i.e., the crosslinking agent (B). In such cases, in order to prevent the composition from increasing the viscosity, some or all of the primary to tertiary amino groups in the compound (A) are preferably neutralized with the Brønsted acid. The neutralization prolongs the effective storage period of the one-component composition, and also prolongs the pot life (usable life) of the two-component composition.

The aqueous curable composition of the present invention may contain various additives such as film formation auxiliaries, surfactants, dispersants, emulsifiers, surface controlling agents, preservatives, antimicrobial agents, antifoaming agents, coloring pigments, extender pigments, fillers, thickeners, plasticizers, antirust agents, organic solvents, etc., according to the use of the composition. Examples of organic solvents include ethanol, ethylene glycol, and like alcohols; tetrahydrofuran, dipropylene glycol dimethyl ether, propylene glycol monomethyl ether, and like ethers; ethyl acetate, butyl acetate, and like esters; methyl isobutyl ketone, methyl ethyl ketone, and like ketones; N-methyl-2-pyrrolidinone, N,N-dimethylacetamide, and like amides; hexane, cyclohexane, toluene, xylene, and like aliphatic, alicyclic, or aromatic hydrocarbons; etc.

The aqueous curable composition has high crosslinking efficiency, since, when it is formed into a coating film, the dehydration condensation reaction of the primary or secondary amino groups optionally neutralized with the Brønsted acid in the compound (A), with (N-alkyl-N-(2-acylacyl)amino)alkyloxy carbonylamino groups in the crosslinking agent (B) proceeds smoothly due to the evaporation of the aqueous medium. Therefore, the crosslinking reaction proceeds even at room temperature, thereby forming a crosslinked coating film having good resistance to heat, solvents and water. If necessary, the curable aqueous composition of the present invention may be heated to promote crosslinking.

The aqueous curable composition of the present invention finds a wide range of applications such as aqueous coating compositions, aqueous bonding agents, aqueous tacky adhesives, aqueous paper processing agents, aqueous inks, aqueous hair spray compositions, aqueous cosmetics, aqueous hair dyes, aqueous manicure preparations, aqueous photosensitive resin compositions, aqueous polymer modifiers, aqueous ion exchange resin compositions, aqueous carrier resin compositions, aqueous resin compositions for controlled release of drugs, etc.

When the aqueous curable composition of the present invention is used as an aqueous coating composition, any substrate can be used. Examples of such substrates include various kinds of plastic materials; various types of metal materials such as steel plates, aluminum plates, and aluminum alloy plates; etc. When metal materials are used as the substrate, materials whose metal surfaces have been subjected to a surface treatment, such as a phosphate treatment or the like, are also usable. Further, such metal materials, plastic materials, etc., may be coated with an undercoat, or with such an undercoat and an intermediate coat.

The aqueous curable composition of the present invention can be applied by known methods such as air spraying, airless spraying, brush coating, etc. The applied coating preferably has a thickness of about 1 to about 100 μm, and more preferably about 5 to about 60 μm, when cured. If necessary, electrostatic application can be conducted by air spraying and airless spraying.

In the aqueous curable composition of the present invention, the composition including as the compound (A) the cationic resin (A') is suitably used as a cationic electrodeposition coating composition. When the composition is used as a cationic electrodeposition coating composition, a conductive substrate is used as the substrate.

The cationic electrodeposition coating composition containing the cationic resin (A') and the crosslinking agent (B) can be produced using a known method.

For example, all or some of the cationic resin (A') previously neutralized with Brønsted acid is fully mixed with the crosslinking agent (B), and then the resulting mixture is dispersed in water, thereby producing the composition. Further, the crosslinking agent (B), in which the viscosity is adjusted using a solvent as required, is gradually added dropwise while stirring all or some of the aqueous dispersion of the cationic resin (A') previously neutralized with Brønsted acid.

Such a cationic electrodeposition coating composition does not require curing catalysts, such as tin compounds, etc., which were essential for known cationic electrodeposition coating compositions.

The cationic electrodeposition coating composition can be mixed, if necessary, with polyester resins, acrylate resins, and like resins for modification; coloring pigments, extender pigments, antirust pigments, organic solvents, pigment dispersants, surface control agents, and like coating composition additives. In such cases, organic solvents include, for example, ethanol, ethylene glycol, and like alcohols; tetrahydrofuran, dipropylene glycol dimethyl ether, propylene glycol monomethyl ether, and like ethers; ethyl acetate, butyl acetate, and like esters; methyl isobutyl ketone, methyl ethyl ketone, cyclohexanone, and like ketones; N-methyl-2-pyrrolidinone, N,N-dimethylacetamide, and like amides; hexane, cyclohexane, toluene, xylene, and like aliphatic, alicyclic, or aromatic hydrocarbons; etc.

The cationic electrodeposition coating composition can be applied on the surface of the substrate by cationic electrodeposition coating. More specifically, the electrodeposition coating is conducted under the following conditions: the cationic electrodeposition coating composition is diluted with deionized water or the like to obtain a solids content of about 5 to about 40 wt. %, and particularly 15 to 25 wt. %; the electrical bath in which the pH is adjusted to about 3.0 to about 9.0 has a temperature of about 15° C. to about 40° C.; and a voltage of about 30 to about 400 V is applied.

There is no limitation to the film thickness of the resulting electrodeposition coating film, but the film preferably has a thickness of about 5 to about 40 μm, and more preferably about 10 to about 35 μm, based on the cured coating film.

The cationic electrodeposition coating composition comprising the cationic resin (A') and the crosslinking agent (B) has high crosslinking efficiency, since, when it is formed into a coating film, the dehydration condensation reaction of primary amino groups or/and secondary amino groups in the cationic resin (A') with (N-alkyl-N-(2-acylacyl)amino)alkyloxy carbonylamino groups in the crosslinking agent (B) proceeds smoothly due to the separation and evaporation of water from the reaction system. Therefore, the crosslinking reaction proceeds even at room temperature, thereby forming a crosslinked coating film having good resistance to heat, solvents and water. If necessary, the curable aqueous composition of the present invention may be heated to promote crosslinking. In particular, it is preferable that the composition including a blocked crosslinking agent as the crosslinking agent (B) is heated to accelerate crosslinking.

The heating conditions are usually such that the heating temperature is preferably about 40° C. to about 180° C., more preferably about 60° C. to about 160° C., and the heating time is preferably about 5 to about 200 minutes, more preferably about 15 to about 60 minutes.

Effect of the Invention

The present invention achieves the following remarkable effects.

(1) It is presumed that, unlike the compound in which a hydrogen atom is bonded with a nitrogen atom combined with a 2-acylacyl group, since the crosslinking agent (B), which is the compound having the group of General Formula (I) of the curable composition of the invention, includes a hydrogen atom that is not bonded with a nitrogen atom combined with a 2-acylacyl group, the compound itself and the dilution thereof are likely to be in liquid form at room temperature, and have excellent fluidity and compatibility with the compound (A) having some of the primary amino groups and/or secondary amino groups optionally neutralized with Brønsted acid. Therefore, pulverization and pelletization are unnecessary in the production of the composition, and the crosslinking agent (B), which is a compound having the group of General Formula (I), and the compound (A) can be easily mixed under aqueous conditions, resulting in easy production of the composition.

The crosslinking agent (B), which is the compound having the group of General Formula (1), can be easily prepared using a commercially available product without extraction purification and distillation purification.

(2) In the composition of the invention, the primary amino group, secondary amino group, primary ammonium group, or secondary ammonium group in the compound (A) easily undergo a crosslinking reaction with the (N-alkyl-N-(2-acylacyl)amino)alkyloxycarbonylamino group of the crosslinking agent (B) at room temperature or while heating, to thereby impart excellent curability. In particular, the composition of the present invention exhibits excellent room-temperature curability.

(3) In the aqueous curable composition of the present invention, the composition including as the compound (A) the cationic resin (A') is suitably used as a cationic electrodeposition coating composition.

BEST MODE FOR CARRYING OUT THE INVENTION

The following Production Examples, Reference Examples, Examples, Comparative Examples and Use Examples are provided to illustrate the present invention in further detail, and are not intended to limit the scope of the invention. Various modifications may be made within the scope of the invention.

In these examples, the heating residue, necessity of pretreatment, composition production efficiency, curability, pot life and cationic electrodeposition coating composition were evaluated by the following methods.

Heating Residue (%)

A sample solution or dispersion was placed on a tin dish, and dried by heating in a drying furnace at 110° C. for 3 hours. The remainder was weighed, and the heating residue was calculated according to the following formula.

$$\text{Heating residue}(\%) = (A/B) \times 100$$

wherein A is the weight of the remainder, and B is the weight of the sample solution or dispersion.

Viscosity (Pa·s)

The viscosity was measured at 20° C. at 1 rpm using a C-type Brookfield rotational viscometer described in JIS K 7117-1 with the lowest number-spindle so that the measurement value was within the range of 20% to 95% of full scale. A value of more than 20% of full scale obtained by measurement with a spindle No. 1 was defined as a viscosity of less than 16 Pa·s, whereas a value exceeding 95% of full scale obtained by measurement with a spindle No. 7 was defined as a viscosity of over 30,000 Pa·s.

Pretreatment Necessity

Before producing a curable composition, properties of each component that had been stored at room temperature (20° C.) were examined to identify the need for pretreatment according to the following criteria.

a: Pretreatment was not required since the component was in liquid form.
b: Pretreatments such as pulverization or pelletization were required since the component was in solid form, presenting a difficulty in forming a curable composition without pretreatment.

Production Efficiency of Composition

Each component was introduced in a 200 mL container, and stirred using a disperser for either 5 minutes or 10 minutes at room temperature (20° C.). The production efficiency of the curable composition was evaluated according to the following criteria for each period of time.
a: Free of aggregation and precipitates, resulting in good production efficiency.
b: Aggregation and/or precipitates are observed, resulting in poor production efficiency.

A "T.K. Homo Disper, Model 2.5, VER. 0.1" disperser (tradename of Tokushu Kika Kogyo Co., Ltd.), with a disperser blade about 3 cm in diameter, was used at about 1,000 rpm.

Curability

Each curable composition was applied over a glass plate immediately after production to a thickness of about 40 μm (when cured) using an applicator, and allowed to stand at a temperature of 20° C. for one day to obtain a coating film. The coating film was peeled to measure the initial weight. Next, the coating film was immersed in propylene glycol monomethyl ether for 24 hours, removed, and then dried at 130° C. for one hour. The weight thereof was measured. The insoluble content (%) relative to the propylene glycol monomethyl ether was calculated according to the following formula.

Insoluble content(%)=(weight after drying a coating film/initial weight of the coating film)×100

The curability was then evaluated according to the following criteria.
a: High curability can be obtained when the insoluble content (%)≧80
b: Curability is insufficient when the insoluble content (%)<80

Pot Life

After the resulting curable composition was left for one day at 20° C., properties thereof were observed. The pot life was evaluated according to the following criteria.
aa: Gelation did not occur, resulting in a relatively long pot life.
a: Gelation occurred, resulting in a relatively short pot life.

Evaluation of Cationic Electrodeposition Coating Composition (1) Storage Stability of Coating Composition A cationic electrodeposition coating composition (60 ml) was introduced into and sealed in a 100 ml glass container, and left for 7 days at 20° C. The storage stability was then evaluated according to the following criteria.
a: The composition was free of precipitates, thickening, gelation or other property changes, exhibiting high storage stability.
b: A slight amount of precipitation or thickening was observed; however, the composition was redispersed by stirring and used for electrodeposition coating, exhibiting good storage stability.
c: Significantly enhanced precipitation or gelation was observed. The composition could not be redispersed even by intense stirring, resulting in low storage stability.

(2) Curability of the Coating Composition

The cationic electrodeposition coating composition was applied by electrodeposition coating on a tin plate to a cured film thickness of about 15 μm. The composition was left to stand at room temperature (18 to 20° C.) for one day, or heated in an electric baking furnace at 120° C. for 30 minutes, thereby curing the coating film. The cured coating film was separated to calculate the initial weight. Next, the coating film was removed from the propylene glycol monomethyl ether after 24 hours immersion, and dried at 130° C. for one hour, thereby measuring its weight. The insoluble content (%) relative to the propylene glycol monomethyl ether was calculated according to the following formula.

Insoluble content(%)=(weight after drying a coating film/initial weight of the coating film)×100

The curability was then evaluated according to the following criteria.
a: High curability can be obtained when the insoluble content (%)≧90
b: Practical curability can be obtained when 70≦the insoluble content (%)<90
c: Curability is insufficient when the insoluble content (%)<70

(3) Corrosion Resistance of Electrodeposition Coating Film

The electrodeposition coating composition was applied by electrodeposition coating on a zinc phosphate-treated cold rolled steel to obtain a cured film thickness of about 15 μm. The composition was left to stand at room temperature (18 to 20° C.) for one day, or heated in an electric baking furnace at 120° C. for 30 minutes, thereby curing the coating film to produce a test board. Crosscuts reaching the substrate of the test board were made in each coating film using a knife. The salt spray test was then carried out according to JIS Z2371 for 240 hours. The corrosion resistance was rated on the following scale.
a: The maximum width (one side) of the rusting or blister area was less than 1 mm from the cut (excellent corrosion resistance).
b: The maximum width (one side) of the rusting or blister area was not less than 1 mm, but less than 2.5 mm from the cut (good corrosion resistance).
c: The maximum width (one side) of the rusting or blister area was not less than 2.5 mm, but less than 5 mm from the cut (poor corrosion resistance).
d: The maximum width (one side) of the rusting or blister area was 5 mm or more from the cut, or rusting or blistering could be observed all over the test board (very poor corrosion resistance).

Production Example 1

Production of Cationic Resin (A-1) Having Primary Amino Groups Partially Neutralized with Brønsted Acid "Epikote 1001" (tradename of Japan Epoxy Resin Co., Ltd.; bisphenol A-type epoxy resin; 118.8 g), "Epikote 828EL" (tradename of Japan Epoxy Resin Co., Ltd.; bisphenol A-type epoxy resin; 225 g), and methyl isobutyl ketone (297 g) were added to a 5-liter flask purged with nitrogen. The resulting mixture was stirred and heated to 70° C. to produce a solution. The solution was then cooled, and a mixture of 20 g of "Jef famine D-400" (tradename of Mitsui Fine Chemicals, Inc.; a mixture of a diamine containing a polyoxypropylene group; amount of primary amine: 4.93 mol/kg; total amount of amines: 4.99 mol/kg; amount of active hydrogen: 10 mol/kg) and 58.1 g of 2-ethylhexyl amine was added. After being heated to 80° C. and maintained at that temperature for one hour, the resulting mixture was cooled to 40° C., and 120.2 g of diketimine obtained by dehydration of diethylenetriamine with methyl isobutyl ketone was added. After being heated to 80° C. and maintained at that temperature for one hour, the resulting mixture was further heated to 100° C. and maintained at that temperature for two hours. Then, after being cooled to 80° C., 162 g of water and 27 g of acetic acid were added, and the resulting mixture was maintained at 80° C. to hydrolyze the ketimine moiety into amino groups partially neutralized with acetic acid. After adding 1,227 g of 80° C. deionized water, about 660 g of methyl isobutyl ketone and water was azeotropically removed at 50 to 80° C. under reduced pressure, and the remainder was diluted with deionized water to a heating residue of about 21%, to thereby produce a solution in which the resin (A-1) having primary amino groups partially neutralized with Brønsted acid was emulsified. The total molar concentration of primary amino groups and secondary amino groups partially neutralized with Brønsted acid of the resin was about 1.9 mol/kg, and (the total number of moles of unneutralized primary to tertiary amino groups)/(the total number of moles of neutralized primary to tertiary ammonium groups)=about 2.7 g. The number average molecular weight of the resin was about 6,000.

Production Example 2

Production of Cationic Resin (A-2) Having Sulfonium Groups and Primary Amino Groups Partially Neutralized with Brønsted Acid "Epikote 1001" (tradename of Japan Epoxy Resin Co., Ltd.; bisphenol A-type epoxy resin; 356.3 g), "Epikote 828EL" (tradename of Japan Epoxy Resin Co., Ltd.; bisphenol A-type epoxy resin; 135.0 g), and methyl isobutyl ketone (297 g) were added to a 5-liter flask purged with nitrogen. The resulting mixture was stirred and heated to 70° C. to produce a solution. Then, a mixture of 100 g of "Jeffamine D-2000" (tradename of Mitsui Fine Chemicals, Inc.; a mixture of a diamine containing a polyoxypropylene group; amount of primary amine: 0.95 mol/kg; total amount of amines: 0.96 mol/kg; amount of active hydrogen: 1.9 mol/kg) and 87.8 g of "Armeen CD" (tradename of Lion Corporation; cocoalkylamine; amount of primary amine: 5.1 mol/kg; total amount of amines: 5.1 mol/kg) was added. After the temperature was maintained at 70° C. for 2 hours, 114.2 g of diketimine obtained by dehydration of diethylenetriamine with methyl isobutyl ketone and 3 g of 2,2'-thiodiethanol were added, and 0.5 g of acetic acid was further added. After being heated to 80° C. and maintained at that temperature for one hour, the resulting mixture was further heated to 100° C. and maintained at that temperature for two hours. Then, after being cooled to 80° C., 162 g of water and 27 g of acetic acid were added, and the resulting mixture was maintained at 80° C. to hydrolyze the ketimine moiety into amino groups partially neutralized with acetic acid. After adding 1,982 g of 80° C. deionized water, about 660 g of methyl isobutyl ketone and water was azeotropically removed at 50 to 80° C. under reduced pressure, and the remainder was diluted with deionized water to a heating residue of 21%, to thereby give a solution in which the resin (A-2) having sulfonium groups and primary amino groups partially neutralized with Brønsted acid was emulsified. The total molar concentration of primary amino groups and secondary amino groups partially neutralized with Brønsted acid of the resin was about 1.2 mol/kg, and (the total number of moles of unneutralized primary to tertiary amino groups)/(the total number of moles of neutralized primary to tertiary ammonium groups)=about 3.3 g. The number average molecular weight of the resin was about 6,000.

Production Example 3

Production of Cationic Resin (A-3) Having Primary Amino Groups Partially Neutralized with Brønsted Acid "Epikote 1001" (tradename of Japan Epoxy Resin Co., Ltd.; bisphenol A-type epoxy resin; 118.8 g), "Epikote 828EL" (tradename of Japan Epoxy Resin Co., Ltd.; bisphenol A-type epoxy resin; 225 g), and methyl isobutyl ketone (297 g) were added to a 5-liter flask purged with nitrogen. The resulting mixture was stirred and heated to 70° C. to produce a solution. The solution was then cooled, and a mixture of 20 g of "Jeffamine D-400" (tradename of Mitsui Fine Chemicals, Inc.; a mixture of a diamine containing a polyoxypropylene group; amount of primary amine: 4.93 mol/kg; total amount of amines: 4.99 mol/kg; amount of active hydrogen: 10 mol/kg) and 58.1 g of 2-ethylhexyl amine was added. After being heated to 80° C. and maintained at that temperature for one hour, the resulting mixture was cooled to 40° C., and 120.2 g of diketimine obtained by dehydration of diethylenetriamine with methyl isobutyl ketone, was added. After being heated to 80° C. and maintained at that temperature for one hour, the resulting mixture was further heated to 100° C. and maintained at that temperature for two hours. Then, after being cooled to 80° C., 162 g of water and 12.1 g of acetic acid were added, and the resulting mixture was maintained at 80° C. to hydrolyze the ketimine moiety into amino groups partially neutralized with acetic acid. After adding 1,227 g of 80° C. deionized water, about 660 g of methyl isobutyl ketone and water was azeotropically removed at 50 to 80° C. under reduced pressure, and the remainder was diluted with deionized water to a heating residue of about 21%, to thereby produce a solution in which the resin (A-3) having primary amino groups partially neutralized with Brønsted acid was emulsified. The total molar concentration of primary amino groups and secondary amino groups partially neutralized with Brønsted acid of the resin was about 1.9 mol/kg, and (the total number of moles of unneutralized primary to tertiary amino groups)/(the total number of moles of neutralized primary to tertiary ammonium groups)=about 7.3 g. The number average molecular weight of the resin was about 6,000.

Production Example 4

Production of Resin (B-1) Having (N-methyl-N-(2-acetylacetyl)amino)ethyloxy Carbonylamino Groups Acetonitrile (692.5 g) and diketene (46.5 g) were introduced into a 5,000 mL four-necked flask, and the mixture was cooled so that the temperature in the flask was lowered to −5 to 0° C. while being fully stirred. Diketene and 2-(methylamino)ethanol were simultaneously added dropwise for four hours at a rate of 220 g/h and 196.5 g/h, respectively. During the addition, cooling was suitably conducted to maintain the temperature in the flask at −5 to 0° C. Thereafter, 25.5 g of 2-(methylamino)ethanol was added dropwise at a rate of 196.5 g/h. The resultant was heated to room temperature and aged for 12 hours. Then, while the mixture in the flask was heated to a temperature of 40° C. to 50° C., acetonitrile was removed under reduced pressure, and the resulting mixture was finally kept at a pressure of about 0.001 for 4 hours, to thereby produce about 1,700 g of 2-(N-methyl-N-(2-acetylacetyl)aminoethanol.

The resulting 2-(N-methyl-N-(2-acetylacetyl)aminoethanol (377.5 g), "Duranate TPA-100" (tradename of Asahi Kasei Corporation; isocyanurate structure-containing polyisocyanate; isocyanate amount: 23.1 wt. %; number average molecular weight: about 600) (454.5 g), and dipropylene glycol dimethyl ether (104 g) were added to a 2,000 mL four-necked flask, and stirred under a nitrogen atmosphere. After adding 0.335 g of dibutyltin dilaurate, the resulting mixture was heated to about 60° C. and maintained at that temperature for 16 hours. Thereafter, 104 g of propylene glycol monomethyl ether was added to obtain a solution comprising about 80% of the resin (B-1) having an (N-methyl-N-(2-acetylacetyl)amino)ethyloxy carbonylamino group. Even after being stored at 20° C. for 3 months, this solution did not solidify, but remained in a transparent, liquid state. Therefore, the solution was easily used in the curable composition production, without further treatment. The solution had a viscosity of about 35 Pa·s at 20° C. The molar concentration of the (N-methyl-N-(2-acetylacetyl)amino)ethyloxy carbonylamino group in the resin was about 2.8 mol/kg. The number average molecular weight of the resin was about 1,200.

Production Example 5

Production of Resin (B-2) Having (N-ethyl-N-(2-acetylacetyl)amino)ethyloxy Carbonylamino Groups Acetonitrile (692.5 g) and diketene (46.5 g) were introduced into a 5,000 mL four-necked flask, and the mixture was cooled so that the temperature in the flask was lowered to −5 to 0° C. Diketene and 2-(ethylamino)ethanol were simultaneously added dropwise for 4 hours at a rate of 220 g/h and 233.5 g/h, respectively. During the addition, cooling was suitably conducted to maintain the temperature in the flask at −5 to 0° C. Thereafter, 30 g of 2-(ethylamino)ethanol was added dropwise at a rate of 233.5 g/h. The resultant was heated to room temperature and aged for 12 hours. Then, while the mixture in the flask was heated to a temperature of 40 to 50° C., acetonitrile was removed under reduced pressure, and the resulting mixture was finally kept at a pressure of about 0.001 for 4 hours, to thereby produce about 1,850 g of 2-(N-ethyl-N-(2-acetylacetyl)aminoethanol.

The resulting 2-(N-ethyl-N-(2-acetylacetyl)aminoethanol (411.5 g), "Duranate TPA-100" (Asahi Kasei Corporation; isocyanurate structure-containing polyisocyanate; isocyanate amount: 23.1 wt. %; number average molecular weight: about 600) (454.5 g), and dipropylene glycol dimethyl ether (108.3 g) were added to a 2,000 mL four-necked flask, and stirred under a nitrogen atmosphere. After adding 0.335 g of dibutyltin dilaurate, the resulting mixture was heated to about 60° C. and maintained at that temperature for 16 hours. Thereafter, 108.3 g of propylene glycol monomethyl ether was added to obtain a solution comprising about 80% of the resin (B-2) having an (N-ethyl-N-(2-acetylacetyl)amino)ethyloxy carbonylamino group. Even after being stored at 20° C. for 3 months, this solution did not solidify, but remained in a transparent, liquid state. Therefore, the solution was easily used in the curable composition production, without further treatment. The solution had a viscosity of about 20 Pa·s at 20° C. The molar concentration of the (N-methyl-N-(2-acetylacetyl) amino)ethyloxy carbonylamino group in the resin was about 2.7 mol/kg. The number average molecular weight of the resin was about 1,200.

Production Example 6

Production of Resin (B-3) Having (N-methyl-N-(2-acetylacetyl)amino)ethyloxy Carbonylamino Groups and Polyoxyethylene Groups 2-(N-methyl-N-(2-acetylacetyl)aminoethanol (365.5 g) obtained in Production Example 1, "Uniox M-550" (tradename of NOF Corporation; polyethylene glycol monomethyl ether; molar concentration of the hydroxy group: about 1.82 mol/kg) (41.3 g), and "Duranate TPA-100" (Asahi Kasei Corporation; isocyanurate structure-containing polyisocyanate; isocyanate amount: 23.1 wt. %; number average molecular weight: about 600) (454.5 g), and dipropylene glycol dimethyl ether (107.7 g) were added to a 2,000 mL four-necked flask, and stirred under a nitrogen atmosphere. After adding 0.335 g of dibutyltin dilaurate, the resulting mixture was heated to about 60° C. and maintained at that temperature for 16 hours. Thereafter, 107.7 g of propylene glycol monomethyl ether was added to obtain a solution comprising about 80% of the resin (B-3) having an (N-methyl-N-(2-acetylacetyl)amino)ethyloxy carbonylamino group and a polyoxyethylene group. Even after being stored at 20° C. for 3 months, this solution did not solidify, but remained in a transparent, liquid state. Therefore, the solution was easily used in the curable composition production, without further treatment. The solution had a viscosity of about 20 Pa·s at 20° C. The molar concentration of the (N-methyl-N-(2-acetylacetyl) amino)ethyloxy carbonylamino group in the resin was about 2.6 mol/kg. The number average molecular weight of the resin was about 1,200.

Production Example 7

Production of Resin (B-4) Having (N-methyl-N-(2-acetylacetyl)amino)ethyloxy Carbonylamino Groups Blocked with n-butylamine The resin (B-1) having an (N-methyl-N-(2-acetylacetyl)amino)ethyloxy carbonylamino group obtained in Production Example 4 (1,200 g), and n-butyl amine (245.8 g) were added to a 2,000 mL four-necked flask, and stirred under a nitrogen atmosphere. The resulting mixture was aged for 2 hours at room temperature to thereby obtain a solution comprising about 83% of the resin (B-4) having an (N-methyl-N-(2-acetylacetyl)amino)ethyloxy carbonylamino group blocked with n-butylamine. The molar concentration of the (N-methyl-N-(2-acetylacetyl)amino)ethyloxy carbonylamino group blocked with n-butylamine in the resin was about 2.2 mol/kg.

Reference Example 1

Production of Resin (C-1) Having Aceto Acetamido Groups

Acetonitrile (825 g) and diketene (55.0 g) were introduced into a 5,000 mL four-necked flask, and the mixture was cooled so that the temperature in the flask was lowered to −5 to 0° C. Diketene and 2-aminoethanol were simultaneously added dropwise for 4 hours at a rate of 261.5 g/h and 190 g/h, respectively. In such a case, about 2 hours after the commencement of dropwise addition, the reaction system became uneven, causing stirring difficulty. Therefore, cooled acetonitrile (1,000 g) was further added thereto, and dropwise addition was continued under a suspended state. During the addition, cooling was conducted to maintain the temperature in the flask at −5 to 0° C. Thereafter, 25 g of 2-aminoethanol was added dropwise at a rate of 190 g/h. The resultant was heated to room temperature and aged for 12 hours. Then, while the mixture in the flask was heated to a temperature of 50° C., acetonitrile was removed under reduced pressure, and the resulting mixture was finally kept at a pressure of about 0.001 for 4 hours, to thereby produce about 1,850 g of 2-(acetoacetamido)ethanol.

The resulting 2-(acetoacetamido)ethanol (344.5 g), "Duranate TPA-100" (Asahi Kasei Corporation; isocyanurate structure-containing polyisocyanate; isocyanate amount: 23.1 wt. %; number average molecular weight: about 600) (454.5 g), and dipropylene glycol dimethyl ether (100 g) were added to a 2,000 mL four-necked flask, and stirred under a nitrogen atmosphere. After adding 0.335 g of dibutyltin dilaurate, the resulting mixture was heated to about 60° C. and maintained at that temperature. 2 hours after heating, the reaction system became uneven, and thus the mixture was further heated to 120° C. to achieve a homogeneous state and maintained at that temperature for one hour. Thereafter, 100 g of propylene glycol monomethyl ether was added to obtain a solution comprising about 80% of the resin (C-1) having an (acetoacetamido)ethyloxy carbonylamino group. Although the solution had been clear brown, after being stored at 20° C. for one day the solution transformed into a white solid, despite being diluted with a solvent. Therefore, the solution was incapable of being used in a curable composition production without further treatments. Because of its solid state, it was impossible to measure the viscosity of the solution using a Brookfield rotational viscometer. The molar concentration of the (acetoacetamido)ethyloxy carbonylamino group in the resin was about 2.9 mol/kg. The number average molecular weight of the resin was about 1,100.

Reference Example 2

Production of Resin (C-2) Having Aceto Acetamido Groups 2-(acetoacetamido)ethanol obtained in Reference Example 1 (344.5 g), "Duranate 24A-100" (Asahi Kasei Corporation; biuret structure-containing polyisocyanate; isocyanate amount: 23.6 wt. %; number average molecular weight: about 600) (445 g), and dipropylene glycol dimethyl ether (99 g) were added to a 2,000 mL four-necked flask, and stirred under a nitrogen atmosphere. After adding 0.335 g of dibutyltin dilaurate, the resulting mixture was heated to about 60° C. and maintained at that temperature. Two hours after heating, the reaction system became uneven, and thus the mixture was further heated to 90° C. to achieve a homogeneous state and maintained at that temperature for three hours. Thereafter, 99 g of propylene glycol monomethyl ether was added to obtain a solution comprising about 80% of the resin (C-2) having an (acetoacetamido)ethyloxy carbonylamino group. Although the solution had been clear brown, after being stored at 20° C. for one day the solution transformed into a white solid, despite being subjected to dilution with a solvent. Therefore, the solution was incapable of being used in a curable composition production without further treatments. Because of its solid state, it was impossible to measure the viscosity of the solution using a Brookfield rotational viscometer. The molar concentration of the (acetoacetamido)ethyloxy carbonylamino group in the resin was about 2.9 mol/kg. The number average molecular weight of the resin was about 1,100.

Examples 1 to 11, Comparative Examples 1 to 3

Preparation of Aqueous Curable Composition

Aqueous curable compositions of Examples 1 to 11 and Comparative Examples 1 to 3 were prepared by mixing each component in the amount shown in Tables 1 and 2 below, and stirring the resulting mixture with a disperser. The heating residue of each composition was about 22% by weight. Since Comparative Examples 2 and 3 were judged to require pretreatment, solids obtained in Reference Examples 1 and 2 were ground in a mortar before being mixed with other components.

TABLE 1

|  |  | Example | | | | | | |
|---|---|---|---|---|---|---|---|---|
|  |  | 1 | 2 | 3 | 4 | 5 | 6 | 7 |
| Compound (A) | Resin (A-1) | 11.1 | 11.1 | 10.7 | 10.3 | | | |
|  | Resin (A-2) | | | | | 17.5 | | |
|  | Resin (A-3) | | | | | | 11.1 | 10.7 |
| Compound (B) | Resin (B-1) | 6 | 7.6 | | | 6 | 6 | |
|  | Resin (B-2) | | | 6 | | | | 6 |
|  | Resin (B-3) | | | | 6 | | | |
|  | Resin (B-4) | | | | | | | |
| Acetoacetamido group-containing resin (C-1) | | | | | | | | |
| Acetoacetamido group-containing resin (C-2) | | | | | | | | |
| Dipropylene glycol dimethyl ether | | 1.5 | 1.5 | 1.5 | 1.5 | 1.5 | 1.5 | 1.5 |
| Deionized water | | 15 | 15 | 15 | 15 | 15 | 15 | 15 |
| Ratio 1 | | 0.8 | 1 | 0.8 | 0.8 | 0.8 | 0.8 | 0.8 |
| Ratio 2 | | 2.7 | 2.7 | 2.7 | 2.7 | 3.3 | 7.3 | 7.3 |

TABLE 2

|  |  | Example | | | | Comparative Example | | |
| --- | --- | --- | --- | --- | --- | --- | --- | --- |
|  |  | 8 | 9 | 10 | 11 | 1 | 2 | 3 |
| Compound (A) | Resin (A-1) |  | 9.5 |  |  | 14.7 | 11.4 | 11.4 |
|  | Resin (A-2) |  |  |  |  |  |  |  |
|  | Resin (A-3) | 10.3 |  | 9.5 | 3.2 |  |  |  |
| Compound (B) | Resin (B-1) |  |  |  |  | 1 |  |  |
|  | Resin (B-2) |  |  |  | 6 |  |  |  |
|  | Resin (B-3) | 6 |  |  |  |  |  |  |
|  | Resin (B-4) |  | 6 | 6 |  |  |  |  |
| Acetoacetamido group-containing resin (C-1) |  |  |  |  |  |  | 6 |  |
| Acetoacetamido group-containing resin (C-2) |  |  |  |  |  |  |  | 6 |
| Dipropylene glycol dimethyl ether |  | 1.5 | 1.5 | 1.5 | 1.5 | 1.5 | 1.5 | 1.5 |
| Deionized water |  | 15 | 15 | 15 | 15 | 15 | 15 | 15 |
| Ratio 1 |  | 0.8 | 0.7 | 0.7 | 2.7 | 0.1 | 0.8 * | 0.8 * |
| Ratio 2 |  | 7.3 | 2.7 | 7.3 | 7.3 | 2.7 | 2.7 | 2.7 |

In Tables 1 and 2, the amounts of the components are expressed in "parts by weight". The amounts of the resin components (A), (B), and (C) are expressed in "parts by weight" on a resin solids basis. "Ratio 1" indicates the ratio of (the number of moles of (N-alkyl-N-(2-acylacyl)amino)alkyloxycarbonylamino groups)/(the total number of moles of all or some of the primary amino groups and secondary amino groups optionally neutralized with the Brønsted acid). "Ratio 2" indicates the ratio of (the total number of moles of unneutralized primary to tertiary amino groups)/(the total number of moles of neutralized primary to tertiary ammonium groups) in the Compound B. Note that "Ratio 1*" in Comparative Examples 2 and 3 indicates the ratio of (the number of moles of aceto acetamido alkyloxy carbonylamino groups)/(the total number of moles of all or some of the primary amino groups and secondary amino groups optionally neutralized with a Brønsted acid).

Evaluation of Aqueous Curable Composition

With respect to the aqueous curable compositions obtained in Examples 1 to 11 and Comparative Examples 1 to 3, the pretreatment necessity, composition production efficiency, curability, and pot life were evaluated. The results are shown in Table 3.

TABLE 3

|  |  | Example | | | | | | | | | | | Comparative Example | | |
| --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 1 | 2 | 3 |
| Pretreatment necessity |  | a | a | a | a | a | a | a | a | a | a | a | a | b | b |
| Composition production efficiency | Stirring for 5 minutes | a | a | a | a | a | a | a | a | a | a | a | a | b | b |
|  | Stirring for 10 minutes | a | a | a | a | a | a | a | a | a | a | a | a | b | b |
| Curability |  | a | a | a | a | a | a | a | a | a | a | a | b | — | — |
| Pot life |  | aa | aa | aa | aa | aa | aa | aa | aa | aa | aa | a | a | — | — |

Due to poor production efficiency, the precipitates and aggregation were observed in Comparative Examples 2 and 3 of Table 3, and thus the coating operation was canceled. The "-" symbols in the Curability and Pot life columns indicate that the test was not conducted.

Evaluation of Aqueous Curable Composition Used as an Electrodeposition Coating Composition Use Examples 1 to 10

Electrodeposition coating was carried out in the following manner, using as cationic electrodeposition coating compositions each of the aqueous curable compositions of the present invention obtained in Examples 1 and 3 to 11.

To clarify, each aqueous curable composition was adjusted to a pH of 6.2 and a bath temperature of 28° C., and used as a cationic electrodeposition coating bath. The composition was applied to a cured film thickness of 15 mm using a carbon electrode-treated (anode) and a zinc phosphate-treated (cathode) cold rolled steel sheet (0.8 mm×70 mm×150 mm) at an applied voltage of 100V for an appropriate time. The composition was left to stand at room temperature (18 to 20° C.) for one day, or heated in an electric baking furnace at 120° C. for 30 minutes, and thereby cured. Thus, an electrodeposition coating film was prepared.

Table 4 shows the examination results of the storage stability and curability of the cationic electrodeposition coating composition, and the corrosion resistance of each electrodeposition coating film obtained in Use Examples 1 to 10.

TABLE 4

|  |  | Use example | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
|  |  | Coating composition (Example No.) | | | | | | | | | |
|  |  | 1 | 3 | 4 | 5 | 6 | 7 | 8 | 9 | 10 | 11 |
| Storage stability |  | a | a | a | b | b | b | a | a | a | b |
| Curability | Room temperature/ 1 Day | a | a | a | a | a | a | a | b | b | a |

TABLE 4-continued

| | | Use example | | | | | | | | | |
|---|---|---|---|---|---|---|---|---|---|---|---|
| | | 1 | 2 | 3 | 4 | 5 | 6 | 7 | 8 | 9 | 10 |
| | | Coating composition (Example No.) | | | | | | | | | |
| | | 1 | 3 | 4 | 5 | 6 | 7 | 8 | 9 | 10 | 11 |
| | 120° C./ 30 minutes | a | a | a | a | a | a | a | a | a | a |
| Corrosion resistance | Room temperature/ 1 Day | a | a | a | a | a | a | a | b | b | a |
| | 120° C./ 30 minutes | a | a | a | a | a | a | a | a | a | a |

The invention claimed is:

1. An aqueous curable composition comprising:
(A) a compound having all or some primary amino groups and/or secondary amino groups optionally neutralized with a Brønsted acid; and
(B) a crosslinking agent, the crosslinking agent being a compound having an (N-alkyl-N-(2-acylacyl)amino) alkyloxycarbonylamino group represented by General Formula (I)

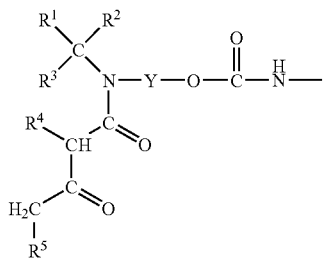

(I)

wherein $R^1$, $R^2$ and $R^3$ are each independently a hydrogen atom or $C_{1-7}$ alkyl group, $R^4$ and $R^5$ are each independently a hydrogen atom or $C_{1-16}$ organic group, and Y is a straight $C_{1-6}$ alkylene group optionally substituted with a $C_{1-6}$ organic group as a substituent.

2. An aqueous curable composition according to claim 1, wherein the compound (A) is at least one member selected from the group consisting of (polyamino)alkanes, (polyamino)polyether compounds, poly(ethyleneimine) compounds, and poly(aminoalkene)s.

3. An aqueous curable composition according to claim 1, wherein the compound (A) is a cationic resin.

4. An aqueous curable composition according to claim 3, wherein the cationic resin is a resin obtained by a polyaddition reaction of a compound comprising two or more glycidyl groups per molecule and an amine compound.

5. An aqueous curable composition according to claim 1, wherein the compound (A) is a compound, which further comprises at least one nonionic hydrophilic group selected from the group consisting of polyoxyethylene groups, polyoxypropylene groups, and polyoxyethylene polyoxypropylene groups.

6. An aqueous curable composition according to claim 1, wherein all or some of the primary amino groups and the secondary amino groups in the compound (A) optionally neutralized with a Brønsted acid have a total molar concentration of 0.05 to 35 mol/kg.

7. An aqueous curable composition according to claim 1, wherein the compound (A) further optionally comprises a tertiary amino group; and wherein the ratio of the total number of moles of the primary to tertiary amino groups unneutralized with a Brønsted acid to the total number of moles of primary to tertiary ammonium groups obtained by neutralizing the amino groups with a Brønsted acid is (the total number of moles of the primary to tertiary amino groups)/(the total number of moles of the primary to tertiary ammonium groups)=0 to 6.0.

8. An aqueous curable composition according to claim 1, wherein the Brønsted acid used for neutralization of the compound (A) is at least one acid selected from the group consisting of methanesulfonic acids, benzenesulfonic acids, toluenesulfonic acids, dodecylbenzenesulfonic acids, hydrochloric acids, phosphoric acids, acetic acids, formic acids, and lactic acids.

9. An aqueous curable composition according to claim 1, wherein the crosslinking agent (B) is a compound obtained by reacting an (N-alkyl-N-(2-acylacyl)amino) alcohol represented by General Formula (II)

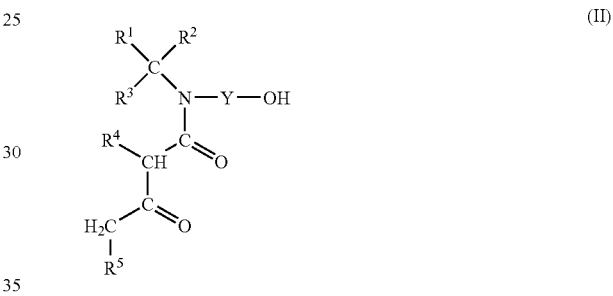

(II)

wherein $R^1$, $R^2$, $R^3$, $R^4$, $R^5$, and Y are as defined above, with a diisocyanate and/or a polyisocyanate having at least one structure selected from the group consisting of isocyanurate structures, allophanate structures, biuret structures, uretdione structures, and carbamate structures.

10. An aqueous curable composition according to claim 1, wherein the crosslinking agent (B) is a compound represented by General Formula (I), wherein $R^1$, $R^2$ and $R^3$ are each independently a hydrogen atom or $C_{1-3}$ alkyl group, and $R^4$ and $R^5$ are both hydrogen atoms.

11. An aqueous curable composition according to claim 1, wherein the crosslinking agent (B) is a compound represented by General Formula (I), wherein Y is an ethylene group optionally substituted with a $C_{1-6}$ organic group as a substituent.

12. An aqueous curable composition according to claim 1, wherein the crosslinking agent (B) is a compound comprising a propylene group optionally substituted with a $C_{1-6}$ organic group as a substituent in General Formula (I).

13. An aqueous curable composition according to claim 1, wherein the crosslinking agent (B) is a compound, which further comprises at least one nonionic hydrophilic group selected from the group consisting of polyoxyethylene groups, polyoxypropylene groups, and polyoxyethylene polyoxypropylene groups.

14. An aqueous curable composition according to claim 1, wherein the molar concentration of the (N-alkyl-N-(2-acylacyl)amino)alkyloxycarbonylamino group of General Formula (I) in the crosslinking agent (B) is 0.02 to 3 mol/kg.

15. An aqueous curable composition according to claim 1, wherein the 2-acylacyl group moiety of the group of General Formula (I) in the crosslinking agent (B) is blocked by at least one blocking agent selected from the group consisting of pyrrolidine, piperidine, morpholine, and compounds represented by General Formula (X)

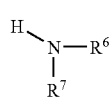
(X)

wherein $R^6$ and $R^7$ are each independently a $C_{1-8}$ organic group optionally substituted with a hydrogen atom or an oxygen atom.

16. An aqueous curable composition according to claim 1, wherein the ratio of the compound (A) to the crosslinking agent (B) is such that the ratio of (N-alkyl-N-(2-acylacyl)amino)alkyloxycarbonylamino groups of General Formula (I) in the crosslinking agent (B) to the total number of moles of primary amino groups and secondary amino groups in the compound (A) is (the number of moles of the (N-alkyl-N-(2-acylacyl)amino)alkyloxycarbonylamino groups)/(the total number of moles of all or some of the primary amino groups and secondary amino groups optionally neutralized with a Brønsted acid)=0.3 to 3.

17. An aqueous curable composition according to claim 3, wherein the aqueous curable composition is used as a cationic electrodeposition coating composition.

* * * * *